United States Patent
Govekar et al.

(10) Patent No.: US 10,871,317 B2
(45) Date of Patent: Dec. 22, 2020

(54) APPARATUS AND METHOD FOR INDICATING STATUS OF MULTI-PHASE VACUUM-ASSISTED RECOVERY OF REFRIGERANT

(71) Applicant: Snap-on Incorporated, Kenosha, WI (US)

(72) Inventors: Craig Govekar, Gurnee, IL (US); Rahhali Sanhaji, Sesto Fiorentino (IT)

(73) Assignee: Snap-on Incorporated, Kenosha, WI (US)

( * ) Notice: Subject to any disclaimer, the term of this patent is extended or adjusted under 35 U.S.C. 154(b) by 172 days.

(21) Appl. No.: 15/161,923

(22) Filed: May 23, 2016

(65) Prior Publication Data

US 2017/0336112 A1    Nov. 23, 2017

(51) Int. Cl.
*F25B 45/00* (2006.01)
*F25B 41/04* (2006.01)
(Continued)

(52) U.S. Cl.
CPC ......... *F25B 45/00* (2013.01); *B60H 1/00585* (2013.01); *B60H 1/00985* (2013.01);
(Continued)

(58) Field of Classification Search
CPC ............ B60H 1/00585; B60H 1/00985; F25B 2345/001; F25B 2345/005; F25B 2345/002; F25B 45/00
See application file for complete search history.

(56) References Cited

U.S. PATENT DOCUMENTS 4,307,775 A    12/1981    Saunders et al.
4,513,578 A     4/1985    Proctor et al.
(Continued)

FOREIGN PATENT DOCUMENTS

EP    2397794 A2    12/2011
EP    3040652 A1     7/2016
(Continued)

OTHER PUBLICATIONS

Serv-I-Quip-Evac-Process-Lights-NPL1, Mar. 13, 2013.*
(Continued)

*Primary Examiner* — Jianying C Atkisson
*Assistant Examiner* — Meraj A Shaikh
(74) *Attorney, Agent, or Firm* — McDonnell Boehnen Hulbert & Berghoff LLP

(57) ABSTRACT

The disclosure relates to apparatuses and methods for indicating status of multi-phase vacuum-assisted recovery of refrigerant from a vehicle. One apparatus for multi-phase vacuum-assisted recovery of refrigerant from a vehicle includes a compressor that removes refrigerant from the vehicle during a first phase and a second phase of a recovery process. The apparatus also includes a vacuum pump to assist the compressor in the removal of refrigerant from the vehicle during a second stage of the recovery process. Further, the vacuum pump is fluidly connected in series with the compressor during the second phase of the recovery process. The apparatus additionally includes one or more status lights and at least one processor to determine a status of the recovery process. At least one of the status lights is illuminated to represent a status of the recovery process, and at least one is visible from 360 degrees around the apparatus.

26 Claims, 13 Drawing Sheets

(51) Int. Cl.
  *F25B 31/00* (2006.01)
  *F25B 43/02* (2006.01)
  *F25B 43/00* (2006.01)
  *B60H 1/00* (2006.01)
(52) U.S. Cl.
  CPC ............ *F25B 31/002* (2013.01); *F25B 41/04* (2013.01); *F25B 43/003* (2013.01); *F25B 43/02* (2013.01); *F25B 2345/001* (2013.01); *F25B 2345/002* (2013.01); *F25B 2345/003* (2013.01); *F25B 2345/005* (2013.01); *F25B 2700/03* (2013.01)

(56) References Cited

U.S. PATENT DOCUMENTS

| | | | |
|---|---|---|---|
| 4,688,388 | A | 8/1987 | Lower et al. |
| 5,046,322 | A | 9/1991 | Bulla et al. |
| 5,067,327 | A | 11/1991 | Leblanc |
| 5,172,562 | A * | 12/1992 | Manz ............... F25B 45/00 62/149 |
| 5,193,351 | A | 3/1993 | Laukhuf et al. |
| 5,230,224 | A | 7/1993 | Ricketts et al. |
| 5,325,675 | A | 7/1994 | Manz et al. |
| 5,377,493 | A | 1/1995 | Friedland |
| 5,431,189 | A | 7/1995 | Jones |
| 5,603,224 | A | 2/1997 | Scaringe et al. |
| 5,709,091 | A | 1/1998 | Todack |
| 5,875,638 | A | 3/1999 | Tinsler |
| 6,138,462 | A | 10/2000 | Murray et al. |
| 6,185,945 | B1 | 2/2001 | Pfefferle et al. |
| 6,427,457 | B1 | 8/2002 | Pfefferle et al. |
| D465,895 | S | 11/2002 | Pfefferle et al. |
| 7,210,300 | B2 | 5/2007 | Suhamo et al. |
| 7,254,954 | B2 | 8/2007 | Govekar |
| 7,310,956 | B2 | 12/2007 | Meldahl et al. |
| 7,310,964 | B2 | 12/2007 | Govekar |
| 7,726,137 | B2 | 6/2010 | Bakker et al. |
| 7,762,089 | B2 | 7/2010 | Govekar et al. |
| 7,845,178 | B1 | 12/2010 | Suhamo et al. |
| 7,905,095 | B2 | 3/2011 | Suhamo et al. |
| 8,261,564 | B2 | 9/2012 | Brown et al. |
| 8,429,921 | B2 | 4/2013 | Suhamo et al. |
| 8,733,114 | B2 | 5/2014 | Bakker et al. |
| 8,887,516 | B2 | 11/2014 | Govekar et al. |
| 2008/0276634 | A1 * | 11/2008 | Brown ............... B60H 1/00585 62/149 |
| 2009/0107160 | A1 * | 4/2009 | Montminy ............... B64F 1/364 62/239 |
| 2009/0113901 | A1 | 5/2009 | Carrubba et al. |
| 2009/0114309 | A1 * | 5/2009 | Sakai ............... F25B 45/00 141/1 |
| 2009/0158756 | A1 | 6/2009 | Brown et al. |
| 2011/0203675 | A1 | 8/2011 | Rahhali |
| 2013/0284277 | A1 | 10/2013 | Rahhali |
| 2013/0312434 | A1 | 11/2013 | Sanhaji |
| 2014/0033742 | A1 | 2/2014 | Esch |
| 2014/0223928 | A1 * | 8/2014 | Esch ............... B60H 1/00585 62/77 |
| 2014/0260353 | A1 * | 9/2014 | Brown ............... F25B 45/00 62/77 |
| 2015/0107279 | A1 | 4/2015 | Sanhaji |
| 2017/0245331 | A1 * | 8/2017 | Barker ............... H05B 45/50 |
| 2018/0164008 | A1 | 6/2018 | Sanhaji |

FOREIGN PATENT DOCUMENTS

| | | |
|---|---|---|
| WO | 2012/059901 A2 | 5/2012 |
| WO | 2014/165248 A1 | 10/2014 |

OTHER PUBLICATIONS

U.S. Appl. No. 15/161,836, filed May 23, 2016; inventors; Craig Govekar, Rahhali Sanhaji.

Roughing Pump—Wikipedia; Retrieved on Apr. 12, 2016; https://en.wikipedia.org/wiki/Roughing_pump.
Roughing Pumps; FMG Enterprises, Inc.; Retrieved on Apr. 12, 2016; http://www.fmgvacpump.com/roughing-pump.asp.
Pressure Sensor—Wikipedia; Retrieved on Apr. 14, 2016; https://en.wikipedia.org/wiki/Pressure_sensor.
Service Center, A/C, ECO (TM) Plus, R134a; Snap-on Incorporated; Retrieved on Mar. 21, 2016; https://store.snapon.com/ECO-Plus-A-C-Service-Center-R134a--Service-Center-A-C-ECO-trade-Plus-R134a-P648708.aspx.
International Search Report, International Application No. PCT/US2017/034054, dated Aug. 3, 2017 (4 pages).
Written Opinion of the International Searching Authority, International Application No. PCT/US2017/034054, dated Aug. 3, 2017 (8 pages).
Mastercool, Inc.; Mastercool ECK1800 user manual—downloaded from the world wide web at http://www.mastercool.com/wp-content/uploads/2015/03/copia_di_d000004039_0002_0001.pdf; Mar. 2015, pp. 1-39 (English).
Mastercool, Inc.; Mastercool 69789-220 Operating Instructions—pp. 1-38 (English); Jul. 2013.
Snap-On Incorporated—Polartek Plus EEAC331 R134a Refrigerant/Recovery/Recycle/Recharge Station manual, Jul. 2016.
Snap-On Incorporated—Polartek Plus EEAC333 R134a Refrigerant/Recovery/Recycle/Recharge Station manual, Jul. 2016.
Alibaba Group Holding Limited, Best Car AC Recovery Recycle Vacuum Recharge Machine Made in China HOS600 downloaded from the world wide web at https://honow.en.alibaba.com/product/60638139976-209911365/Best_Car_AC_Recovery_Recycle_Vacuum_Recharge_Machine_Made_in_China_HO_S600.html prior to May 23, 2016.
Snap-On Incorporated; ECO Xtreme User's Manual, Jun. 2001.
Thermo King; SB-400 TK 51113-2-MM—Manual, Rev. 4, Apr. 2005.
University of California, Santa Barbara, Physics Department, Senior Lab; Vacuum Techniques, downloaded from the world wide web at http://web.physics.ucsb.edu/~phys128/experiments/vacuum/VacuumRev07.pdf, Apr. 12, 2016.
Hippo Technology Co. Ltd; Auto Workshop Equipment, Auto A/C Service Machine for Refrigerant Recovery / Recharge; downloaded at https://web.archive.org/web/20140512015550/http://www.auto-diagnosticstools.com/sale-1862428-auto-workshop-equipment-auto-a-c-service-machine-for-refrigerant-recovery-recharge.html; May 12, 2014.
Snap-On Incorporated; Air Conditioning Equipment and Tools 2010 Catalog.
Snap-On Incorporated; A/C Equipment and Tools, Are you Ready for A/C Season?; Mar. 2013.
Bacharach, Inc.; Bacharach the Measurable Difference / Stinger Refrigerant Recovery Unit / User Manual 2090-0217 Rev. 6; Apr. 2012.
Festo Inc.; Pressure sensors SDE3, with display / Catalog; Mar. 2015.
Bosch Automotive Service Solutions LLC; Recover/Recycling/Recharging Unit / Operating Manual for Model 17800B/17801B; Rev. E (pp. 1-52 (English)) Sep. 9, 2013.
Bosch Automotive Service Solutions LLC; Operating Manual for Model 34988 / Recover, Recycling, Recharging Unit; Rev. E Jul. 30, 2013.
SAE International; Surface Vehicle Standard / HFC-134a (R-134a) Recover/Recycle/Recharging Equipment for Mobile Air-Conditioning Systems; J2788 Jan. 2013.
SAE International; Surface Vehicle Standard / R-1234yf [HFO-1234yf] Recovery/Recycling/Recharging Equipment for Flammable Refrigerants for Mobile Air-Conditioning Systems; J2843 Jan. 2013.
Snap-On Incorporated; User's Manual; Kool Care; Part No. ZEEAC304D Revision A; 1999.
Ingersol-Rand Company; Thermo King / Operator's Manual; Tripac EVOLUTION Auxiliary Heating/Cooling Temperature Management System; TK 55711-19-OP / Rev. 2, Mar. 2016.

(56) References Cited

OTHER PUBLICATIONS

Ingersol-Rand Company; Thermo King / Installation Manual; NAD Truck Edition V-200 and V-300 Series; TK 51856-1 IM / Rev. 8 Aug. 2014.

Transducers Direct; The TDH41 Series Better Accuracy, Low Cost, OEM Vacuum and Compound Range Pressure Transducer data sheet / Jan. 2012.

European Patent Office, Communication Pursuant to Article 94(3) EPC for Application No. 17 728 963.4-1008, 6 pages, dated Apr. 22, 2020.

Office of the Federal Register, National Archives and Records Administration; Federal Register, vol. 58, No. 92, pp. 28491-28755 (see at least pp. 28659-28736); May 14, 1993.

United States Enviornmental Protection Agency; Stationary Refrigeration—Prohibition on Venting Refrigerants; 1 page; Sep. 26, 2016; downloaded from https://www.epa.gov/section608/stationary-refrigeration-prohibition-enting-refrigerants on Apr. 20, 2020.

* cited by examiner

APPARATUS AND METHOD FOR INDICATING STATUS OF MULTI-PHASE VACUUM-ASSISTED RECOVERY OF REFRIGERANT

BACKGROUND

Many vehicles come equipped with systems that utilize refrigerants, such as air conditioning systems, for example. The refrigerant (1,1,1,2-tetrafluoroethane—R-134a, for example) contained within such systems may need to be removed on occasion. In order to remove the refrigerant, refrigerant recovery apparatuses may be used. To meet certain recovery standards, such refrigerant recovery apparatuses may use a compressor assisted by a vacuum pump to recover the refrigerant from the vehicle. The recovery process can occur as a multi-phase process; a first phase in which the compressor removes refrigerant from the vehicle, and a second phase in which the vacuum pump assists the compressor in removing refrigerant from the vehicle. Because there may be multiple factors that affect the recovery process, it can be advantageous to determine a status of the recovery process and display the determined status.

Overview

Several example embodiments that relate to apparatuses and methods for indicating status of multi-phase vacuum-assisted recovery of refrigerant are described herein.

Viewed from one aspect, an example embodiment takes the form of an apparatus configured to recover refrigerant from a vehicle. The apparatus includes a compressor configured to remove refrigerant from the vehicle during a first phase and a second phase of a recovery process. The apparatus also includes a vacuum pump configured to assist the compressor in the removal of refrigerant from the vehicle during the second phase of the recovery process. The vacuum pump is fluidly connected in series with the compressor during the second phase of the recovery process. The apparatus further includes one or more status lights. The apparatus additionally includes at least one processor programmed to determine a status of the recovery process and output one or more signals to illuminate at least one of the one or more status lights. The at least one illuminated status light represents the determined status of the recovery process. At least one of the one or more status lights is visible from 360 degrees around the apparatus.

Viewed from another aspect, an example embodiment takes the form of a method for recovering refrigerant from a vehicle. The method includes removing refrigerant from the vehicle, using a compressor within an apparatus, during a first phase and a second phase of a recovery process. The method also includes assisting, by a vacuum pump within the apparatus that is fluidly connected in series with the compressor, the compressor in removing refrigerant from the vehicle during the second phase of the recovery process. The method further includes determining, by at least one processor executing instructions stored on a non-transitory computer-readable medium, a status of the recovery process. The method additionally includes outputting, by the at least one processor executing the instructions, one or more signals to illuminate at least one of one or more status lights to represent the determined status of the recovery process. At least one of the one or more status lights is visible from 360 degrees around the apparatus. Still further, the method includes ceasing assistance, by the vacuum pump within the apparatus, of the compressor.

Viewed from yet another aspect, an example embodiment takes the form of a non-transitory computer-readable medium having stored thereon instructions executable by at least one processor to control an apparatus configured to recover refrigerant from a vehicle to perform functions. The functions include engaging a compressor within the apparatus during a first phase of a recovery process and a second phase of the recovery process. The functions also include engaging a vacuum pump within the apparatus to assist the compressor during the second phase of the recovery process. The functions further include determining a status of the recovery process. Additionally, the functions include outputting one or more signals to illuminate at least one of one or more status lights. The at least one illuminated status light represents the determined status of the recovery process. At least one of the one or more status lights is visible from 360 degrees around the apparatus. Still further, the functions include disengaging the vacuum pump to cease assisting the compressor.

These as well as other aspects and advantages will become apparent to those of ordinary skill in the art by reading the following detailed description, with reference to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the following drawings.

DETAILED DESCRIPTION

I. Introduction

Figure 1:
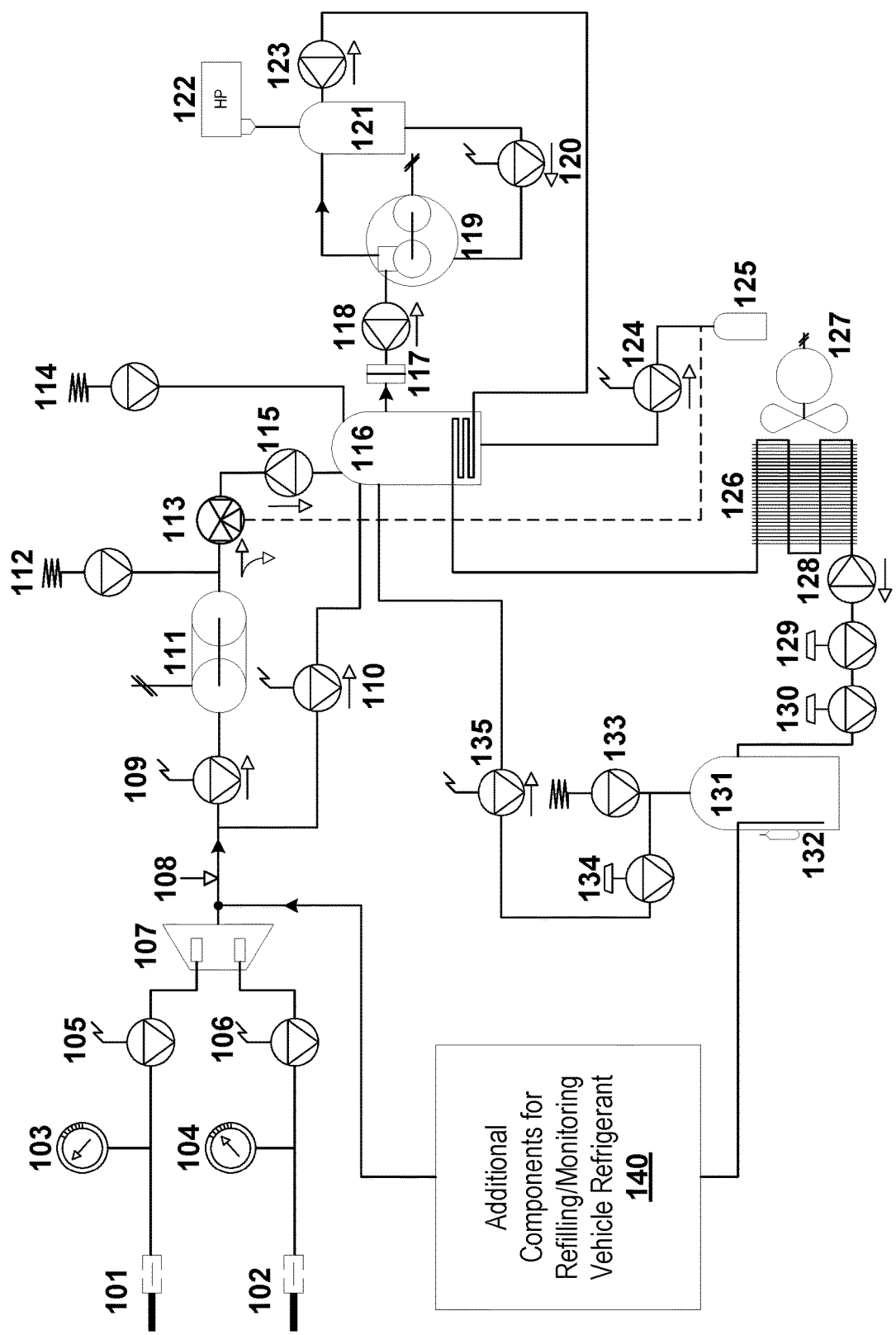
FIG. 1 is a schematic diagram showing an apparatus, according to example embodiments.

This description describes several example embodiments, at least some of which pertain to indicating status of multi-phase vacuum-assisted recovery of refrigerant. At least some of the example embodiments disclosed herein include apparatuses, methods, and systems. One such embodiment is an apparatus that performs the multi-phase vacuum-assisted recovery of refrigerant. The apparatus can include a compressor, a vacuum pump, and one or more status lights. The apparatus can recover refrigerants from a vehicle by being fluidly connected to an air-conditioning unit within the vehicle, for example.

The compressor can initially remove refrigerant from the vehicle without the assistance of the vacuum pump. The unassisted removal of refrigerant from the vehicle by the compressor can constitute a first phase of a refrigerant recovery process. The recovered refrigerant can be stored in a storage tank after it is withdrawn from the vehicle. The more refrigerant removed from the vehicle, the more the pressure within the apparatus may decrease. At a certain point, the vacuum pump can begin assisting the compressor in the removal of refrigerant from the vehicle. To assist the compressor in the removal of refrigerant from the vehicle, the vacuum pump may be fluidly connected in series with the compressor. Additionally or alternatively, the vacuum pump can be engaged by the processor, for example, to begin assisting the compressor.

The vacuum pump and compressor, working in tandem, can now remove additional refrigerant from the vehicle. This cooperative removal of refrigerant using the vacuum pump and the compressor can constitute a second phase of the refrigerant recovery process. Similar to the first phase of the refrigerant recovery process, the pressure within the apparatus may continue to decrease as further refrigerant is extracted from the vehicle. At a given point, the vacuum pump can cease assisting the compressor in the removal of refrigerant from the vehicle. The vacuum pump ceasing assistance of the compressor can include disconnecting the vacuum pump from the series connection with the compressor. This can be done using a switching means, such as a valve or a solenoid, for example. Additionally or alternatively, the vacuum pump can be disengaged to cease its assistance of the compressor.

The apparatus can include one or more status lights. At least one of the status lights can be viewable from 360 degrees around the apparatus. A control system, for example, can determine a status of the recovery process and output a signal to illuminate at least one of the one or more status lights. The determined status of the recovery process can be based on the current phase of the recovery process. Alternatively, the determined status may be based on the current pressure within the apparatus, the current fill level of the storage tank, the current temperature of the storage tank, etc. Furthermore, the determined status can be an in-progress status, a ready status, or a user input required status. The illuminated status lights can correlate to the determined status of the recovery process.

In this description, the articles "a," "an," and "the" are used to introduce elements and/or functions of the example embodiments. The intent of using those articles is that there is one or more of the introduced elements and/or functions. In this description, the intent of using the term "and/or" within a list of at least two elements or functions and the intent of using the terms "at least one of" and "one or more of" immediately preceding a list of at least two elements or functions is to cover each embodiment including a listed element or function independently and each embodiment comprising a combination of the listed elements or functions. For example, an embodiment described as comprising "A, B, and/or C," or "at least one of A, B, and C," or "one or more of A, B, and C" is intended to cover each of the following possible embodiments: (i) an embodiment comprising A, but not B and C, (ii) an embodiment comprising B, but not A and C, (iii) an embodiment comprising C, but not A and B, (iv) an embodiment comprising A and B, but not C, (v) an embodiment comprising A and C, but not B, (v) an embodiment comprising B and C, but not A, and (vi) an embodiment comprising A, B, and C. For the embodiments comprising element or function A, the embodiments can comprise one A or multiple A. For the embodiments comprising element or function B, the embodiments can comprise one B or multiple B. For the embodiments comprising element or function C, the embodiments can comprise one C or multiple C. In this description, the use of ordinal numbers such as "first," "second," "third" and so on is to distinguish respective elements rather than to denote a particular order of those elements unless the context of using those terms explicitly indicates otherwise.

In this description, the terms "data," "information," and "content" are used interchangeably. The data described herein can be transmitted and received. As an example, any transmission of the data described herein can occur directly from a transmitting device (e.g., a transmitter) to a receiving device (e.g., a receiver). As another example, any transmission of the data described herein can occur indirectly from the transmitter to a receiver via one of one or more intermediary network devices, such as an access point, an antenna, a base station, a hub, a modem, a relay, a router, a switch, and/or some other network device. The transmission of any of the data described herein can include transmitting the data over an air interface (e.g., using radio signals (i.e., wirelessly)). The transmission of any of the data described herein can include transmitting the data over a wire (e.g., a single wire, a twisted pair of wires, a fiber optic cable, a coaxial cable, a wiring harness, a power line, a printed circuit, a CAT5 cable, and/or CAT6 cable). The wire can be referred to as a "conductor" and/or by another term. As an example, transmission of the data over the conductor can occur electrically and/or optically.

Figure 11:
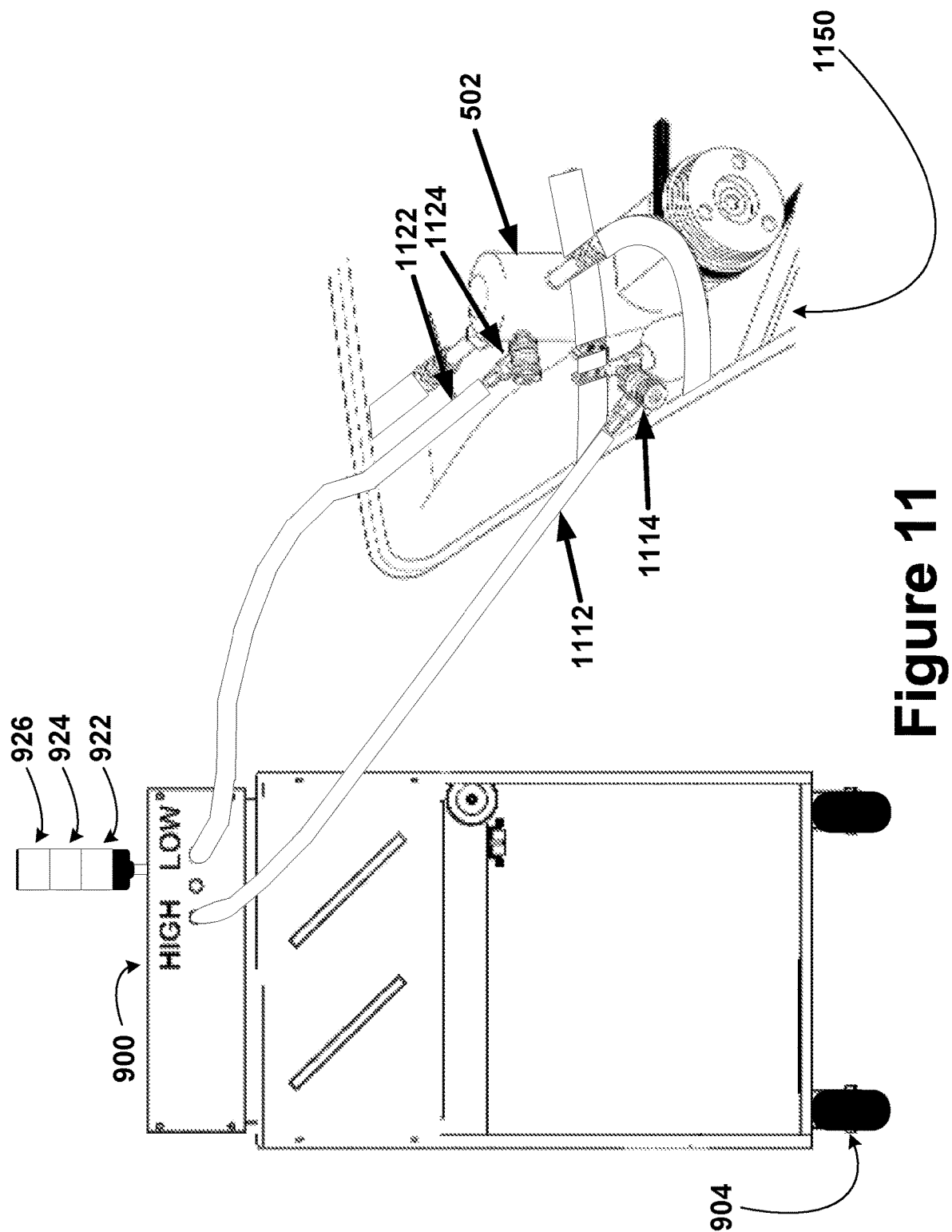
FIG. 11 is an illustration of an apparatus connected to a vehicle, according to example embodiments.

A vehicle as described herein, such as the vehicle 1150 partially illustrated in FIG. 11, is a mobile machine that can be used to transport a person, people, and/or cargo. Any vehicle described herein can be driven and/or otherwise guided along a path (e.g., a paved road or otherwise) on land, in water, in the air, and/or outer space. Any vehicle described herein can be wheeled, tracked, railed, and/or skied. Any vehicle described herein can include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, and/or a farm machine. As an example, a vehicle guided along a path can include a van (such as a dry or refrigerated van), a tank trailer, a platform trailer, or an automobile carrier. Any vehicle described herein can include and/or use any appropriate voltage and/or current source, such as a battery, an alternator, a fuel cell, and the like, providing any appropriate current and/or voltage, such as about 12 volts, about 42 volts, and the like. Any vehicle described herein can include and/or use any desired system and/or engine to provide its mobility. Those systems and/or engines can include vehicle components that use fossil fuels, such as gasoline, natural gas, propane, and the like, electricity, such as that generated by a battery, magneto, fuel cell, solar cell and the like, wind and hybrids and/or combinations thereof. Any vehicle described herein can include an electronic control unit (ECU), a data link connector (DLC), and a vehicle communication link that connects the DLC to the ECU.

The data can represent various things such as objects and conditions. The objects and conditions can be mapped to a data structure (e.g., a table). A processor can refer to the data structure to determine what object and/or condition is represented by the data. As an example, the data received by a processor can represent a refrigerant capacity value. The processor can determine one or more threshold pressures by comparing the data to a data structure that defines threshold pressures with respect to refrigerant capacity values.

The diagrams, flow charts, and data shown in the figures are provided merely as examples and are not intended to be limiting. Many of the elements illustrated in the figures and/or described herein are functional elements that can be implemented as discrete or distributed elements, individually or in conjunction with other element(s), and in any suitable combination and/or location. Those skilled in the art will appreciate that other arrangements and elements (e.g., machines, interfaces, functions, orders, and/or groupings of functions) can be used instead. Furthermore, the functions described as being performed by one or more elements can be carried out by a combination of hardware, firmware, and/or software (e.g., a processor that executes computer-readable program instructions).

II. Example Systems

FIG. 1 is a diagram showing an apparatus 100 that is configured to recover refrigerant from a vehicle, according to example embodiments. The refrigerant can be a fluid used in a refrigeration system within the vehicle. The apparatus 100 can additionally be configured to recover other fluids from systems that utilize refrigerants (e.g., refrigerant oil from a vehicle refrigerant system). The apparatus 100 includes symbols with corresponding reference numerals that describe particular components of the apparatus 100. For example, plumbing components of the apparatus like valves and tanks are depicted. The lines in between components of the apparatus 100 represent fluid connections via plumbing lines; the arrowheads overlaying the lines represent a possible direction of fluid flow. Various subsets of the components can be controlled by a control system, such as a processor executing instructions stored on a non-transitory computer-readable medium.

The symbols indicated with references numerals 101/102 represent a low pressure fitting and a high pressure fitting, respectively. The low pressure fitting 101 and/or the high pressure fitting 102 can be connected to a device within a vehicle that contains refrigerant, such as an air-conditioning unit within the vehicle, for example. The refrigerant within the vehicle may be a liquid, a gas, or a combination of both. Further, the refrigerant may be a liquid, a gas, or a combination of both when the refrigerant is removed from the vehicle at the low pressure fitting 101 and/or the high pressure fitting 102. Example refrigerants include industry standard refrigerants like dichlorodifluoromethane (R-12), chlorodifluoromethane (R-22), 1,1,1,2-tetrafluoroethane (R-134a), etc.

The low pressure fitting 101 and the high pressure fitting 102 permit fluid communication between the apparatus 100 and the vehicle. The low pressure fitting 101 can be connected to the low pressure side of the device within the vehicle that contains refrigerant. Similarly, the high pressure fitting 102 can be connected to the high pressure side of the device within the vehicle that contains refrigerant. The low pressure fitting 101 and/or the high pressure fitting 102 can be connected to the respective side of the device within the vehicle that contains refrigerant at a port within the device, for example. The low pressure fitting 101 and the high pressure fitting 102 can be male or female connectors. For example, the low pressure fitting 101 and the high pressure fitting 102 can be female connectors threaded on the inside to allow for a mating with a male connector on the device within the vehicle that contains refrigerant. Furthermore, the low pressure fitting 101 and the high pressure fitting 102 can be interchangeable components within the apparatus 100, allowing connections to a wide array of vehicle makes and models, each with a potentially unique air-conditioning unit, for example.

The symbols indicated with reference numerals 103/104 represent a low pressure manometer and a high pressure manometer, respectively. The low pressure manometer 103 and the high pressure manometer 104 can be analog or digital devices. The low pressure manometer 103 and the high pressure manometer 104 can output pressure readings to a display. For example, if the manometers are analog manometers, they may output to an analog display, such as a needle overlaying a range of values displayed angularly around the circumference of an arc (similar to that depicted by the symbols in FIG. 1 that represent the manometers), like a gauge. Alternatively, the low pressure manometer 103 and the high pressure manometer 104 can output pressure readings to a digital display. Such a display can have adjustable settings, such as pressure resolution and displayed pressure units, for example. Furthermore, the manometers 103/104 can be connected to a control system within the apparatus 100. Such a control system can use the manometer readings to ensure proper functionality of the low pressure and the high pressure intake portions of the apparatus 100 and/or to prevent extreme pressures from damaging portions of the apparatus 100.

The symbols indicated with reference numerals 105/106 represent a low pressure electronic valve and a high pressure electronic valve, respectively. The low pressure electronic valve 105 and the high pressure electronic valve 106 can be controlled by a control system within the apparatus 100 or can be controlled remotely by a secondary device. In alternate embodiments, the electronic valves 105/106 can be replaced with manual valves. The low pressure electronic valve 105 and the high pressure electronic valve 106 can permit the low pressure intake and the high pressure intake from the vehicle to be shut off, respectively. For example, if the high pressure manometer 104 transmits a pressure reading to the control system that the control system determines exceeds a threshold pressure within the apparatus 100 that may damage the apparatus 100, the control system can transmit a signal to close the high pressure electronic valve 106 to prevent such damage from occurring.

The symbol indicated with reference numeral 107 represents a manifold. The manifold 107 combines the low pressure and high pressure fluid inputs accessed from the vehicle through the low pressure fitting 101 and the high pressure fitting 102. The manifold 107 can include a mechanical filter fitted to the low pressure intake and the high pressure intake, in some embodiments. The mechanical filter can prevent debris that was present inside of the vehicle from entering the apparatus 100. Additionally, the mechanical filter can be replaceable, to ensure that if the mechanical filter no longer permits the transmission of fluid (because it is inundated with debris from previous refrigerant recovery processes, for example), the mechanical filter can be replaced. Downstream of the manifold 107, fluid that was taken in by the apparatus 100 from the vehicle at the high pressure intake and at the low pressure intake will be merged and flow together.

The symbol indicated with reference numeral 108 represents a pressure transducer. The pressure transducer 108 can measure a pressure within the apparatus 100 at the location of the pressure transducer 108. The measured pressure can provide an absolute pressure measurement (i.e., the measured pressure is compared with an absolute vacuum). The pressure transducer 108 can be connected to the plumbing line via a port, in some embodiments. In alternate embodiments, a pressure switch or a pressure gauge can be used, rather than or in addition to the pressure transducer 108. The pressure transducer 108 can output the measured pressure in the form of a voltage signal, for example, where the voltage value corresponds to the measured pressure. In some example embodiments, the pressure transducer 108 will transmit a signal corresponding to the measured pressure to a control system within the apparatus 100. This transmission can occur wirelessly or wireline.

The symbol indicated with reference numeral 109 represents an electronic inlet valve 109 to a vacuum pump 111. The electronic inlet valve 109 to the vacuum pump 111 can be controlled by a control system within the apparatus 100. For example, the electronic inlet valve 109 to the vacuum pump 111 can be closed during a first phase of a recovery process to prevent refrigerant from flowing to the vacuum pump 111, and can be opened during a second phase of the recovery process to permit refrigerant to flow to the vacuum pump 111. The electronic inlet valve 109 to the vacuum pump 111 can receive an electronic signal from the control system indicating a change of state for the valve (open when closed or close when open, for example). Such a signal can prompt the electronic inlet valve 109 to the vacuum pump 111 to mechanically open or close to accommodate the instruction from the control system.

The symbol indicated with reference numeral 110 represents an electronic inlet valve 110 to an oil evaporator/separator/vacuum chamber 116. The electronic inlet valve 110 to the oil evaporator/separator/vacuum chamber 116 can be controlled by a control system within the apparatus 100. For example, the electronic inlet valve 110 to the oil evaporator/separator/vacuum chamber 116 may be closed during the second phase of the recovery process to prevent refrigerant from flowing directly to the oil evaporator/separator/vacuum chamber 116, and can be opened during the first phase of the recovery process to permit refrigerant to be diverted around the vacuum pump 111. The electronic inlet valve 110 to the oil evaporator/separator/vacuum chamber 116 can receive an electronic signal from the control system indicating a change of state for the valve (open when closed or close when open, for example). Such a signal can prompt the electronic inlet valve 110 to the oil evaporator/separator/vacuum chamber 116 to mechanically open or close to accommodate the instruction from the control system.

In alternate embodiments, both the electronic inlet valve to the vacuum pump 109 and the electronic inlet valve to the oil evaporator/separator/vacuum chamber 110 can be replaced by a single three-way valve that only permits fluid flow to the vacuum pump 111 or to the oil evaporator/separator/vacuum chamber 116.

The symbol indicated with reference numeral 111 represents a vacuum pump. The vacuum pump 111 can be controlled external to the apparatus 100. Alternatively, the vacuum pump 111 can be controlled by a control system within the apparatus 100. For example, during the first phase of the recovery process, the vacuum pump 111 can be disengaged. At the beginning of the second phase of the recovery process, the vacuum pump 111 can receive a signal from the control system indicating that the vacuum pump 111 be engaged to assist the compressor in the recovery of refrigerant from the vehicle. At the conclusion of the second phase of the recovery process, the vacuum pump 111 can receive another signal from the control system indicating that the vacuum pump 111 be disengaged to cease assisting the compressor in the recovery of refrigerant from the vehicle. Engaging and/or disengaging the vacuum pump 111 can include providing/removing electrical power to the vacuum pump 111. This can be done by closing/opening electrical relays or electrical switches, in some embodiments.

The vacuum pump 111, mechanically, serves to evacuate fluid, such as gas (e.g., air), from the apparatus 100. The vacuum pump 111 can include a vacuum chamber that is evacuated to create a vacuum. Alternatively, the vacuum pump 111 can withdraw fluid from within hoses in the apparatus 100. The inherent low pressure created by the vacuum pump 111 creates a pressure difference that aids in the removal of refrigerant from the vehicle. The vacuum pump 111 can use additional fluids (e.g., oil) or additional components (e.g., rubber O-rings) to aid in the creation of a seal to generate the vacuum.

The vacuum pump 111 can be a high and/or an ultra-high vacuum pump, in various embodiments (e.g., the vacuum pump 111 is best suited to evacuate fluid when the pressure in the apparatus 100 is at a high or ultra-high vacuum level). In alternate embodiments, the apparatus 100 can additionally comprise a roughing pump. Such a roughing pump can be configured to evacuate fluid from the apparatus 100 at a higher pressure (e.g., atmospheric pressure or above) until the pressure is sufficiently low (e.g., the pressure is low enough that a high or ultra-high vacuum pump can function). The roughing pump can assist a compressor 119 during a first stage of a refrigerant recovery process, in some embodiments. Furthermore, in alternate embodiments, the vacuum pump 111 can comprise a roughing pump in addition to a high and/or an ultra-high vacuum pump.

The symbol indicated with reference numeral 112 represents a vacuum pump safety valve. The vacuum pump safety valve 112 can allow excess fluid to be removed from the system in the case that there is too much fluid (e.g., refrigerant) at the downstream end of the vacuum pump 111. Additionally, if the pressure differential created by the vacuum pump 111 is too great, the vacuum pump safety valve 112 can be opened to allow air to flow into the system to re-stabilize the apparatus 100. The vacuum pump safety valve 112 can be configured to automatically open when a certain pressure differential is applied across it. Alternatively, the vacuum pump safety valve 112 can be controlled by a control system within the apparatus 100 (e.g., the control system can transmit electronic signals to the vacuum pump safety valve 112 to instruct the valve to open or close).

The symbol indicated with reference numeral 113 represents a three-way valve that can divert fluid flow from the oil evaporator/separator/vacuum chamber 116 to a used oil container 125. The potential alternate route of fluid flow is represented by a dashed line between the three-way valve 113 and the used oil container 125. The fluid that can flow through this alternate route between the three-way valve 113 and the used oil container 125 can be oil used by the vacuum pump 111 rather than refrigerant recovered from the vehicle. For example, after a number of refrigerant recovery processes have been run, it may be necessary to empty the oil within the vacuum pump 111 in order to replace it. This can be done by changing the direction of the three-way valve 113 such that the used oil can be diverted to the used oil container 125. The three-way valve 113 can be controlled by a control system within the apparatus 100 (e.g., the control system can transmit electronic signals to the three-way valve 113 to instruct the three-way valve 113 to open or close). Additionally or alternatively, the three-way valve 113 can be accessible by a user of the apparatus 100 such that the three-way valve 113 is manually adjustable.

The symbol indicated with reference numeral 114 represents an oil evaporator/separator/vacuum chamber safety valve. The oil evaporator/separator/vacuum chamber safety valve 114 can allow excess fluid to be removed from the oil evaporator/separator/vacuum chamber 116 in the case that there is too much fluid (e.g., refrigerant) in the oil evaporator/separator/vacuum chamber 116. Additionally, if the pressure within the oil evaporator/separator/vacuum chamber 116 is too great, some of the fluid within the oil evaporator/separator/vacuum chamber 116 may need to be released. To accomplish this, the oil evaporator/separator/vacuum chamber safety valve 114 can be opened. The oil evaporator/separator/vacuum chamber safety valve 114 can be configured to automatically open when a certain pressure differential is applied across it. Alternatively, the oil evaporator/separator/vacuum chamber safety valve 114 can be controlled by a control system within the apparatus 100 (e.g., the control system can transmit electronic signals to the oil evaporator/separator/vacuum chamber safety valve 114 to instruct the valve to open or close).

The symbol indicated with reference numeral 115 represents a vacuum check valve. The vacuum check valve 115 ensures that fluid does not flow back from the oil evaporator/separator/vacuum chamber 116 into the vacuum pump 111 during a first phase or a second phase of a recovery process. Therefore, the vacuum check valve 115 prevents the low pressure generated by the vacuum pump 111 from drawing fluid back into the vacuum pump 111 from portions of the apparatus 100 that are downstream of the vacuum pump 111.

The symbol indicated with reference numeral 116 represents the oil evaporator/separator/vacuum chamber. The oil evaporator/separator/vacuum chamber 116 is configured to evaporate the refrigerant within the fluid mixture that is within the oil evaporator/separator/vacuum chamber 116. This can involve heating the fluid mixture to a temperature such that the refrigerant evaporates (i.e., undergoes a phase change from a liquid to a gas), while the rest of the fluids (e.g., oil from the vacuum pump 111) remain in a liquid state (i.e., do not have a high enough temperature so that they also undergo a phase change to a gas). The refrigerant can evaporate in the oil evaporator/separator/vacuum chamber 116 because the pressure in the oil evaporator/separator/vacuum chamber 116 is less than the vapor pressure for the refrigerant. Once the refrigerant is evaporated, it can be separated from the other fluids in the oil evaporator/separator/vacuum chamber 116. For example, the gaseous part of the mixture can be removed from an upper portion of the oil evaporator/separator/vacuum chamber 116. The refrigerant that is removed in a gaseous form can then be sent downstream to the compressor 119 by the oil evaporator/separator/vacuum chamber 116. The oil, currently in a liquid phase, can be then removed from the oil evaporator/separator/vacuum chamber 116 and transmitted downstream to the used oil container 125.

Furthermore, when the vacuum pump 111 is engaged, a vacuum can be generated in the oil evaporator/separator/vacuum chamber 116. This can assist in the separation of the refrigerant from the other fluids, and aid in the recovery of the refrigerant from the vehicle. For example, during the second phase of the recovery process, the vacuum pump 111 can create a low pressure within the oil evaporator/separator/vacuum chamber 116 to assist the compressor 119 in removing refrigerant from the vehicle.

The symbol indicated with reference numeral 117 represents an evaporator filter. The evaporator filter 117 can remove any particulates from the gaseous refrigerant mixture, for example. An example evaporator filter 117 is a dense screen. In this way, the evaporator filter 117 can prevent compounds that are not gaseous refrigerant from being transmitted to the compressor 119.

The symbol indicated with reference numeral 118 represents an evaporator check valve. The evaporator check valve 118 ensures that fluid does not flow back upstream from the compressor 119 into the oil evaporator/separator/vacuum chamber 116. Therefore, the high pressure generated by the compressor 119 cannot force fluid back into the oil evaporator/separator/vacuum chamber 116.

The symbol indicated with reference numeral 119 represents a compressor. The compressor 119 serves to compress the gaseous refrigerant and any remaining contaminants (i.e., increase the pressure of the gaseous refrigerant and any remaining contaminants by reducing the volume of the gaseous refrigerant and any remaining contaminants). This mixture of gaseous refrigerant and trace contaminants (e.g., oil from the compressor) is then transported downstream by the compressor 119 to an oil separator 121. The compressor 119 can be engaged by a control system during the first phase and the second phase of the recovery process to remove refrigerant from the vehicle. Engaging the compressor 119 can include providing electrical power to the compressor 119. This can be done by closing electrical relays or electrical switches, in some embodiments. The compressor 119 may remove refrigerant from the vehicle during the first and second phase of the recovery process by pulling it from the vehicle. For example, as a piston is pulled in one direction within the compressor 119, a low pressure can be created within the compressor 119. This low pressure can serve to suck fluid into the compressor 119 through a suction port, in some embodiments. This suction force can be propagated down the plumbing lines of the apparatus 100 back to the vehicle, thereby pulling fluid from the vehicle.

The symbol indicated with reference numeral 120 represents an electronic valve 120 for refilling oil within the compressor 119. Oil that is recovered by the oil separator 121 can be transported to the compressor 119 to refill the compressor 119 allowing the compressor 119 to continue compressing gases. The electronic valve 120 for refilling oil within the compressor 120 can be opened to allow for the oil to refill the compressor 119. The opening and closing of the electronic valve 120 for refilling oil within the compressor 119 may be controlled by the compressor 119, in some embodiments. In other embodiments, the electronic valve 120 for refilling oil within the compressor 119 can be controlled by a control system within the apparatus 100 (e.g., the control system can transmit electronic signals to the electronic valve 120 for refilling oil within the compressor 119 to instruct the valve to open or close). This can be done by the control system in response to an oil level reading that was transmitted to the control system by the compressor 119.

The symbol indicated with reference numeral 121 represents the oil separator. The oil separator 121 again separates oil from within the gaseous refrigerant/oil mixture. The oil separator 121 thus serves to increase the concentration of refrigerant within the fluid mixture. The oil separated from the gaseous refrigerant/oil mixture can be transported back to the compressor 119. In addition, the fluid mixture, now with a more purified refrigerant concentration, is transported downstream to a condenser 126.

The symbol indicated with reference numeral 122 represents a safety pressure switch. To ensure the oil separator 121 does not experience a pressure that is too extreme for the oil separator 121 to function properly (e.g., without being destroyed), the safety pressure switch 122 can be present. The safety pressure switch 122 can trigger in response to reading a pressure that is above a certain safety threshold pressure. Alternatively, the safety pressure switch 122 can trigger in response to detecting a threshold pressure difference between an exterior pressure (e.g., atmospheric pressure) and a pressure inside the oil separator 121. When the safety pressure switch 122 triggers, the compressor 119 can be disengaged, in some embodiments. This can occur, for example, by the safety pressure switch 122 transmitting an electronic signal to the compressor 119. In alternate embodiments, the safety pressure switch 122, upon triggering, can transmit an electronic signal to a control system within the apparatus 100.

The symbol indicated with reference numeral 123 represents a check valve that prevents fluid from flowing back into the oil separator 121 after leaving the oil separator 121.

The symbol indicated with reference numeral 124 represents an electronic oil discharge valve. The electronic oil discharge valve 124 allows fluid from the oil evaporator/separator/vacuum chamber 116 to be discharged to the used oil container 125. The electronic oil discharge valve 124 can be controlled remotely by an end user, in some embodiments. Alternatively, a control system within the apparatus 100 can control the electronic oil discharge valve 124 (e.g., the control system can transmit electronic signals to the electronic oil discharge valve 124 to instruct the valve to open or close).

The symbol indicated with reference numeral 125 represents the used oil container. The used oil container 125 can contain used oil that was used by the vacuum pump 111 or the oil evaporator/separator/vacuum chamber 116, for example, in performing tasks required for recovering refrigerant from the vehicle. The used oil container 125 can be detachable and/or interchangeable by a user of the apparatus 100, in some embodiments.

The symbol indicated with reference numeral 126 represents the condenser. The condenser 126 condenses fluids (i.e., transforms the fluid from a gaseous phase to a liquid phase by reducing the temperature of the fluid). The fluid that is transmitted through the condenser 126 can be comprised of mostly refrigerant, in some embodiments. The condenser 126 can comprise many coils, thereby increasing the surface area to volume ratio of the condenser 126 to increase the heat lost by the fluid to the surrounding environment.

The symbol indicated with reference numeral 127 represents an electric fan. The electric fan 127 can serve to cool the condenser 126. The condenser 126 can be cooled by the electric fan 127 such that it the temperature within the condenser 126 is low enough to condense the refrigerant that was removed from the vehicle.

The symbol indicated with reference numeral 128 represents a check valve that prevents fluid that leaves the condenser 126 from reentering the condenser 126.

The symbols indicated with reference numeral 129/130 represent manual valves. The manual valves 129/130 can be opened/closed externally be a user of the apparatus 100, in some embodiments. One or both of the manual valves 129/130 can be three-way valves, in some embodiments, allowing for refrigerant to be tapped and retrieved at the location of the manual valves. This can occur as the refrigerant flows downstream from the condenser 126 during the recovery process. Alternatively, this can allow for refrigerant to be retrieved from a storage tank 131 during or after the recovery process.

The symbol indicated with reference numeral 131 represents a storage tank. The storage tank 131 can store the refrigerant that is recovered from the vehicle after the refrigerant passes through the other portions of the apparatus 100. In some embodiments, the storage tank 131 can be detachable and/or interchangeable by a user of the apparatus 100. Additionally, the storage tank 131 can include a level indicator that displays to a user of the apparatus 100 how much of the storage tank 131 is filled with fluid and/or when the storage tank 131 needs to be replaced/changed.

The symbol indicated with reference numeral 132 represents a storage tank temperature probe. The storage tank temperature probe 132 can have an analog or digital display that is legible by users of the apparatus 100, in some embodiments. Additionally or alternatively, the storage tank temperature probe 132 can transmit temperature measurements to a control system within the apparatus 100. The temperature within the storage tank 131 can indicate whether the refrigerant within the storage tank is in a gaseous or a liquid state.

The symbol indicated with reference numeral 133 represents an electronic storage tank safety valve. The electronic storage tank safety valve 133 can allow excess fluid to be removed from the storage tank 131 in the case that there is too much fluid (e.g., refrigerant) in the storage tank 131. Additionally, if the pressure within the storage tank 131 is too great, some of the fluid within the storage tank 131 may need to be released. To accomplish this, the electronic storage tank safety valve 133 can be opened. The electronic storage tank safety valve 133 can be configured to automatically open when a certain pressure differential is applied across it. Alternatively, the electronic storage tank safety valve 133 can be controlled by a control system within the apparatus 100 (e.g., the control system can transmit electronic signals to the electronic storage tank safety valve 133 to instruct the valve to open or close).

The symbol indicated with reference numeral 134 represents another manual valve. The additional manual valve 134 can be opened/closed externally be users of the apparatus 100, in some embodiments. The additional manual valve 134 can be a three-way valve, in some embodiments, allowing for refrigerant to be retrieved from the storage tank 131 during or after the recovery process. The additional manual valve 134 can also be closed to prevent fluid within the storage tank 134 from flowing to the oil evaporator/separator/vacuum chamber 116.

The symbol indicated with reference numeral 135 represents an electronic evaporator overpressure valve. The electronic evaporator overpressure valve 135 can have an associated threshold pressure. If the pressure on the electronic evaporator overpressure valve 135 is greater than the associated threshold pressure, the electronic overpressure valve 135 can open to allow fluid to flow from the storage tank 131 to the evaporator/separator/vacuum chamber 116. The associated threshold pressure can be set remotely by a user of the apparatus 100, in some embodiments. In alternate embodiments, the associated threshold pressure can be set by a control system within the apparatus 100. Alternatively, the electronic evaporator overpressure valve 135 can include a pressure transducer and a transmitter that transmits the pressure measured by the included pressure transducer to the control system. The control system can then determine if the measured pressure exceeds a threshold value. If the measured pressure does exceed a threshold value, the control system can transmit electronic data to the electronic evaporator overpressure valve 135 instructing it to open. If the measured pressure does not exceed a threshold value, the control system can transmit electronic data to the electronic evaporator overpressure valve 135 instructing it to close.

The block indicated with reference numeral 140 represents additional components for refilling/monitoring vehicle refrigerant. In some embodiments, the additional components for refilling/monitoring vehicle refrigerant 140 can include check valves, manual valves, electronic control valves, filters, and pressure transducers. Additionally, the additional components for refilling/monitoring vehicle refrigerant 140 can include a container of tracer dye. The tracer dye can be injected into an air-conditioning system of a vehicle, for example, through the low pressure fitting 101 and/or the high pressure fitting 102. Following a path traced out by the tracer dye within the air-conditioning system of the vehicle can allow the identification of leaks within the vehicle, for instance. In other embodiments, the additional components for refilling/monitoring vehicle refrigerant 140 can include a container of new refrigerant for injection into the vehicle by the apparatus 100. Still further, the additional components for refilling/monitoring vehicle refrigerant 140 can include a container of polyalkylene glycol (PAG) oil. The PAG oil can be injected by the apparatus 100 into the vehicle for use by a compressor within the vehicle's air-conditioning system, for example.

Figure 2:
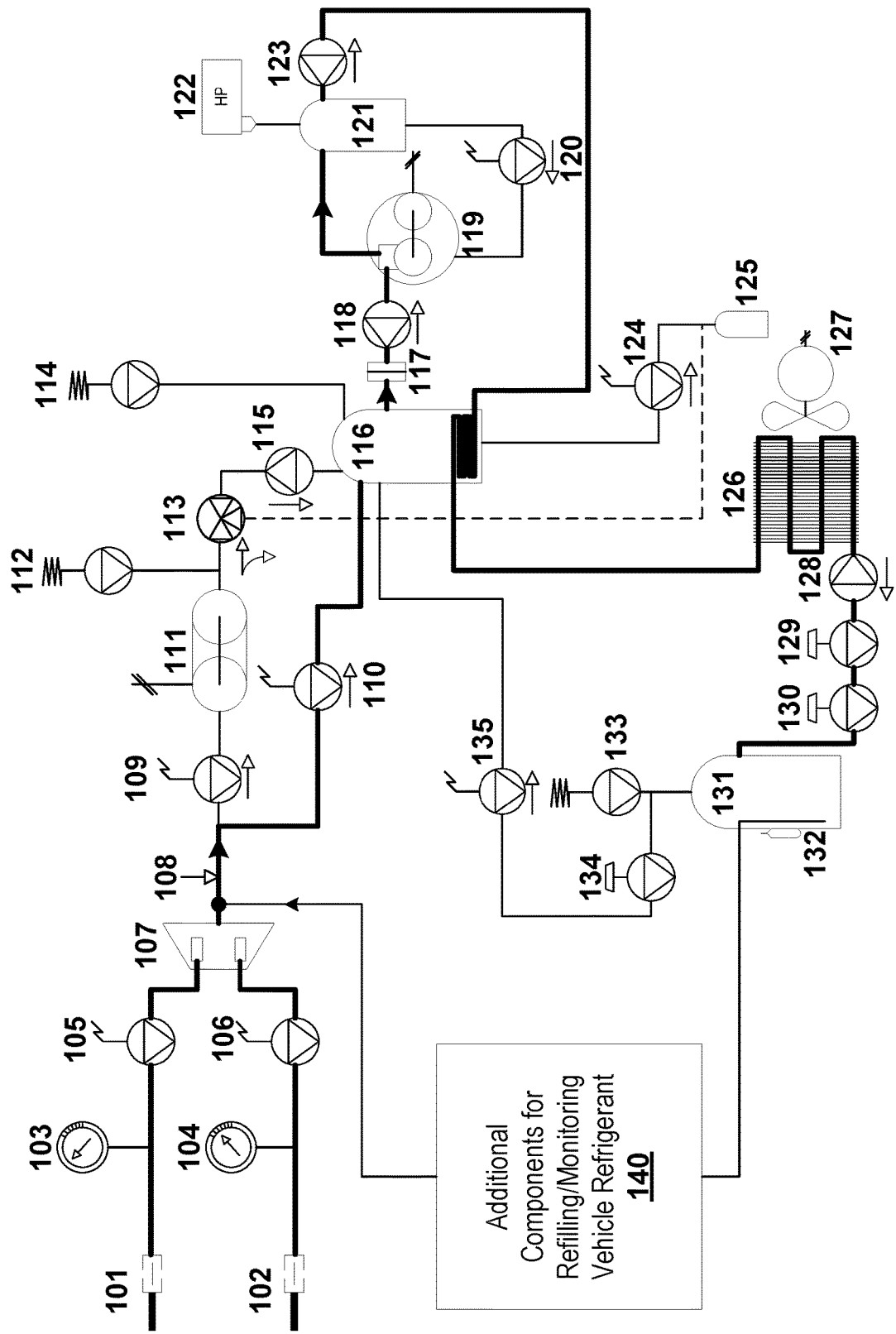
FIG. 2 is a schematic diagram showing a fluid flow path, according to example embodiments.

FIG. 2 is a diagram showing a fluid flow path during a first phase of a refrigerant recovery process, according to example embodiments. The fluid flow path is meandering through plumbing included in the apparatus 100 as shown in FIG. 1. As can be seen, during the first phase of the recovery process, the fluid, such as refrigerant, for example, is inlet from the vehicle. After being inlet from the vehicle through the low pressure fitting 101 and/or the high pressure fitting 102, the fluid flows through the low pressure electronic valve 105 and/or the high pressure electronic valve 106, respectively. The refrigerant is then transported through the manifold 107. After leaving the manifold 107, the refrigerant flows through the electronic inlet valve to the oil evaporator/separator/vacuum chamber 110 to the oil evaporator/separator/vacuum chamber 116 (the refrigerant is prevented from flowing to the vacuum pump 111 because the electronic inlet valve to the vacuum pump 109 is closed during the first phase of the refrigerant recovery process). The refrigerant leaves the oil evaporator/separator/vacuum pump 116 through the evaporator filter 117 and the evaporator check valve 118 and is transported to the compressor 119. After being compressed, the refrigerant passes through the oil separator 121 and the check valve that prevents fluid from flowing back into the oil separator 123. The refrigerant then flows through the condenser 126. After being condensed, the refrigerant passes through three more valves 128/129/130 and into the storage tank 131. During this first phase of the refrigerant recovery process, the refrigerant is being recovered from the vehicle by the compressor 119 without the assistance of the vacuum pump 111.

Figure 3:
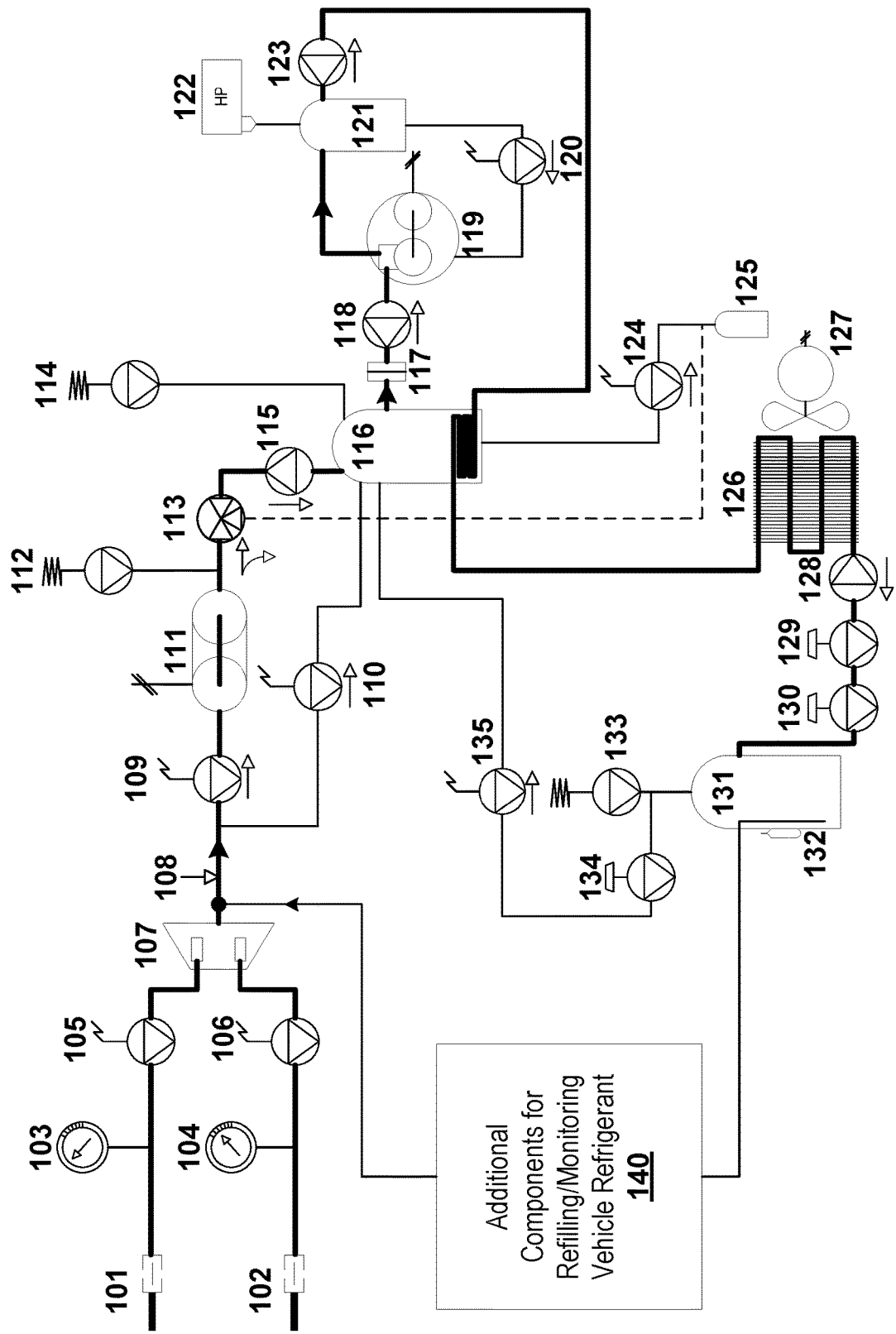
FIG. 3 is a schematic diagram showing a fluid flow path, according to example embodiments.

FIG. 3 is a diagram showing a fluid flow path during a second phase of a refrigerant recovery process, according to example embodiments. The fluid flow path is meandering through plumbing included in the apparatus 100 as shown in FIG. 1. As can be seen, during the second phase of the recovery process, the fluid, such as refrigerant, for example, is inlet from the vehicle. After being inlet from the vehicle through the low pressure fitting 101 and/or the high pressure fitting 102, the fluid flows through the low pressure electronic valve 105 and/or the high pressure electronic valve 106, respectively. The refrigerant is then transported through the manifold 107. After leaving the manifold 107, the refrigerant flows through the electronic inlet valve to the vacuum pump 109 to the vacuum pump 111 (the refrigerant is prevented from flowing directly to the oil evaporator/separator/vacuum chamber 116 because the electronic inlet valve to the oil evaporator/separator/vacuum chamber 110 is closed during the second phase of the refrigerant recovery process). The refrigerant leaves the oil evaporator/separator/vacuum pump 116 through the evaporator filter 117 and the evaporator check valve 118 and is transported to the compressor 119. After being compressed, the refrigerant passes through the oil separator 121 and the check valve that prevents fluid from flowing back into the oil separator 123. The refrigerant then flows through the condenser 126. After being condensed, the refrigerant passes through three more valves 128/129/130 and into the storage tank 131. During this second phase of the recovery process, the refrigerant is being recovered from the vehicle by the compressor 119 assisted by the vacuum pump 111.

Figure 4:
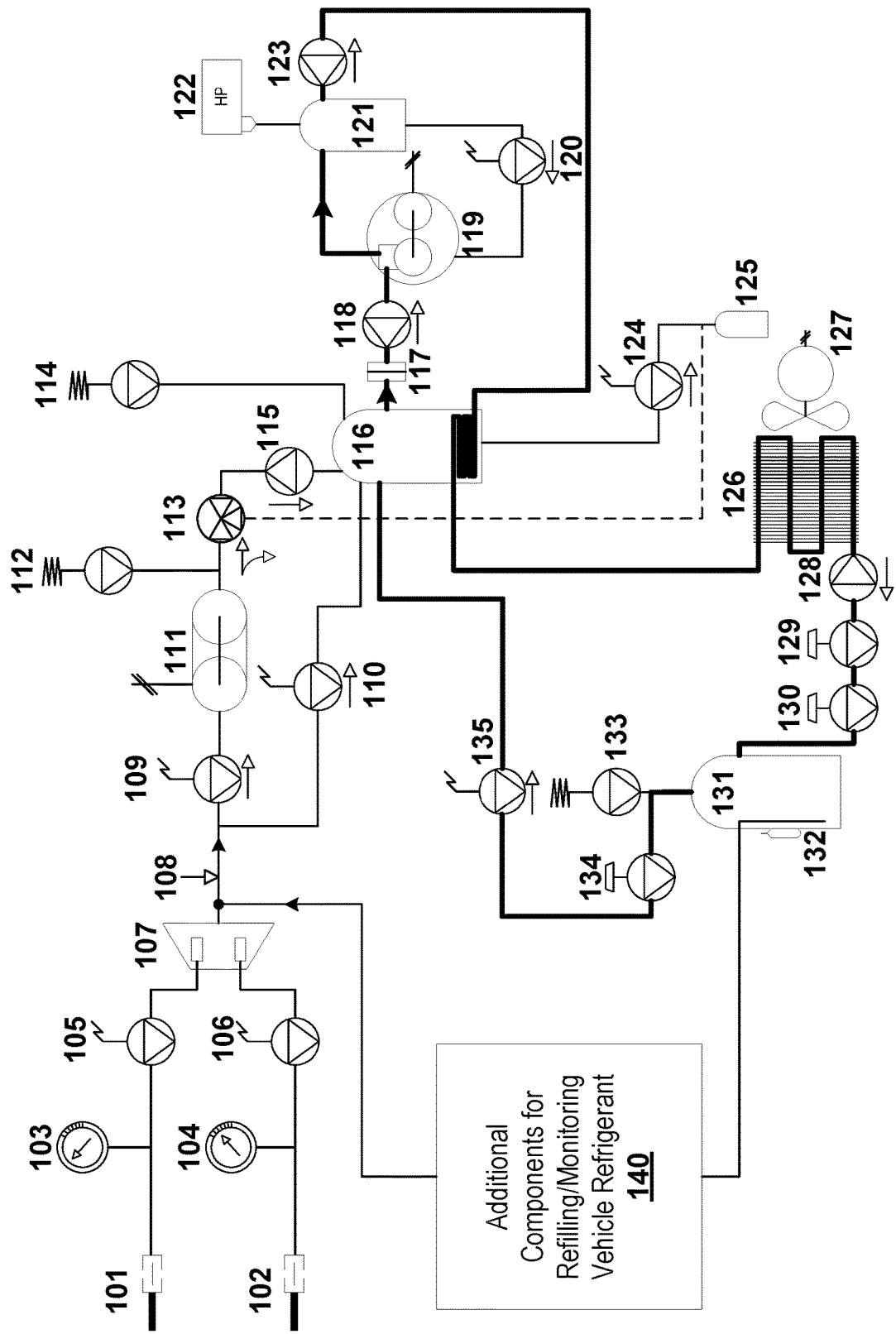
FIG. 4 is a schematic diagram showing a fluid flow path, according to example embodiments.

FIG. 4 is a diagram showing a fluid flow path during a third phase of a refrigerant recovery process, according to example embodiments. In the third phase of the refrigerant recovery process, the apparatus 100 can be removing residual refrigerant still remaining within the plumbing components interior to the apparatus 100, such as interior hoses, for example. This can be done by the residual refrigerant being drawn from the oil evaporator/separator/vacuum chamber 116 through the evaporator filter 117 and the evaporator check valve 118 by the compressor 119. After being compressed, the residual refrigerant passes through the oil separator 121 and the check valve that prevents fluid from flowing back into the oil separator 123. The refrigerant then flows through the condenser 126. After being condensed, the refrigerant passes through three more valves 128/129/130 and into the storage tank 131.

Additionally, as illustrated in FIG. 4, refrigerant can be recycled through the oil evaporator/separator/vacuum chamber 116 from the storage tank 131. The refrigerant can be in a liquid or gaseous form when flowing to the oil evaporator/separator/vacuum chamber 116. The refrigerant can flow through the manual valve 134, as well as the electronic evaporator overpressure valve 135, on its way to the oil evaporator/separator/vacuum chamber 116.

Figure 5:
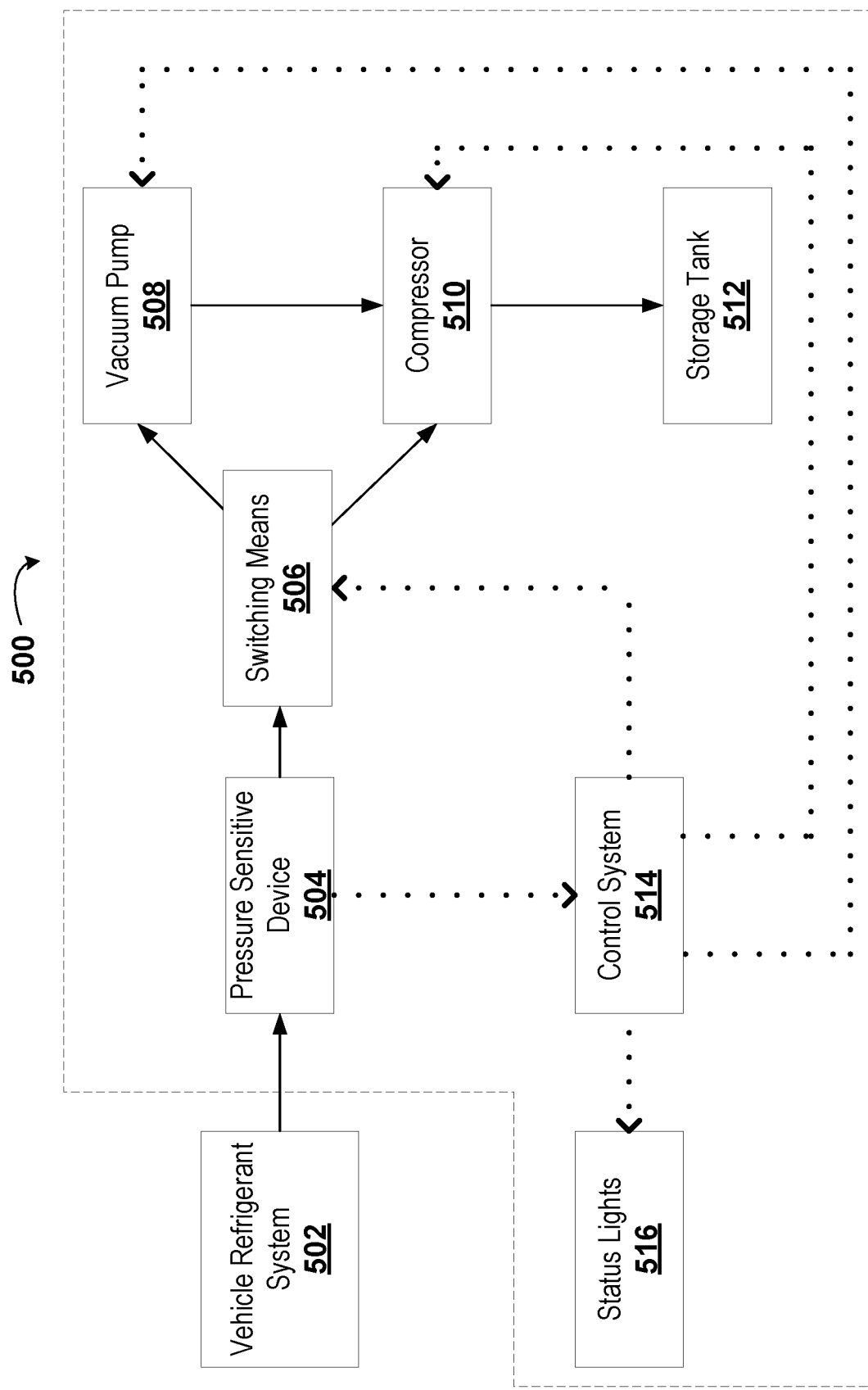
FIG. 5 is a block diagram of an apparatus, according to example embodiments.

FIG. 5 is a block diagram of an apparatus 500 configured to recover refrigerant from a vehicle refrigerant system 502, according to example embodiments. For example, the apparatus 500 shown in FIG. 5 can be analogous to the apparatus 100 shown in FIG. 1. The apparatus 500 is fluidly connectable to the vehicle refrigerant system 502 and includes at least one pressure sensitive device 504, a switching means 506, a vacuum pump 508, a compressor 510, a storage tank 512, a control system 514, and one or more status lights 516. The solid arrows in the diagram illustrate fluid connections, the dotted arrows illustrate wireless or wireline electrical connections, and the dashed box delineates those components that are part of the apparatus 500 from those components that are exterior to the apparatus 500. In alternate embodiments, some of the components bounded by the dashed box can be outside the apparatus 500. For example, the control system 514 or the storage tank 512 can be components that are not part of the apparatus 500.

The apparatus 500 illustrated in FIG. 5 is configured to recover refrigerant from a vehicle using a multi-phase recovery process. The first phase of the recovery process can include the compressor 510 removing refrigerant from the vehicle refrigerant system 502 and depositing the recovered refrigerant in the storage tank 512. The compressor 510 can be engaged at the beginning of the first phase of the recovery process after receiving an electronic transmission from the control system 514 to do so. The first phase of the recovery process can occur when a pressure in the apparatus 500 is greater than a first threshold pressure. The pressure sensitive device 504 can measure a pressure in the apparatus 500 to determine that the pressure is greater than the first threshold pressure and then responsively transmit a notification to the control system 514. The control system 514 can then engage the compressor 510 to remove refrigerant from the vehicle without the assistance of the vacuum pump 508. Furthermore, the control system 514 can transmit an electrical signal to illuminate one or more of the status lights 516 to indicate an "in progress—first phase" status of the recovery process, for example. During the first phase of the recovery process, the pressure sensitive device 504 can be repeatedly measuring a first pressure within the apparatus 500. The pressure sensitive device 504 can transmit these pressure measurements to the control system 514. The pressure sensitive device 504 can measure the first pressure within the apparatus 500 and/or a second pressure within the apparatus 500 and/or one or more other pressures within the apparatus 500, in various embodiments. The pressure sensitive device 504 can also, in some embodiments, continually provide pressure measurements or signals representing pressure measurements to the control system 514.

Upon receiving the pressure measurements from the pressure sensitive device 504, the control system 514 can determine if the first threshold pressure has been reached. If the first threshold pressure has not been reached, the first phase of the recovery process can proceed. If the first threshold pressure has been reached, the control system 514 can send an electrical signal to indicate to the switching means 506 that the direction of refrigerant flow be diverted. The (one or more) switching means 506 can thus switch such that the refrigerant removed from the vehicle flows through the vacuum pump 508 prior to flowing through the compressor 510. In addition, the control system 514 can transmit a signal to the vacuum pump 508 to engage the vacuum pump 508. The switching of the switching means 506 and the engaging of the vacuum pump 508 can delineate the beginning of a second phase of the recovery process. Furthermore, the control system 514 can transmit another electrical signal to illuminate one or more of the status lights 516 to indicate an "in progress—second phase" status of the recovery process, for example. Alternatively, in some embodiments, the control system 514 can transmit an electrical signal to illuminate one or more of the status lights 516 to indicate an "in progress" status of the recovery process during both the first and the second phase of the recovery process.

The second phase of the recovery process can include the compressor 510 removing refrigerant from the vehicle refrigerant system 502 with the assistance of the vacuum pump 508 and depositing the recovered refrigerant in the storage tank 512. The vacuum pump 508 can be most effective when the first pressure in the apparatus is below the first threshold pressure, and therefore assists the compressor 510 when the first threshold pressure is reached. The vacuum pump 508 can, in assisting the compressor 510 during the second phase of the recovery process, more efficiently remove refrigerant from the vehicle than the compressor 510 alone, for example. During the second phase of the recovery process, the pressure sensitive device 504 can repeatedly measure a second pressure within the apparatus 500. The pressure sensitive device 504 can transmit these pressure measurements to the control system 514.

Upon receiving the pressure measurements from the pressure sensitive device 504, the control system 514 can determine if a second threshold pressure has been reached. In some embodiments, the first threshold pressure is greater than the second threshold pressure. If the second threshold pressure has not been reached, the second phase of the recovery process can proceed. If the second threshold has been reached, the control system 514 can send an electrical signal to indicate to the switching means 506 that the direction of refrigerant flow be diverted. The (one or more) switching means 506 can thus switch such that the refrigerant removed from the vehicle flows directly through the compressor 510 (i.e., around the vacuum pump 508). In addition, the control system 514 can transmit a signal to the vacuum pump 508 to disengage the vacuum pump 508. The switching of the switching means 506 and the disengaging of the vacuum pump 508 can delineate the end of the second phase of the recovery process. Furthermore, the control system 514 can transmit another electrical signal to illuminate one or more of the status lights 516 to indicate an "in progress—third phase" status of the recovery process, for example. In other embodiments, the control system 514 can transmit an electrical signal to illuminate one or more of the status lights 516 to indicate a "ready" status or a "user input required" status.

The vehicle refrigerant system 502 can be an air-conditioning system, for example. Furthermore, the pressure sensitive device 504 (or multiple pressure sensitive devices, in some embodiments) can be located at various locations within the apparatus 500, as the pressure within the apparatus 500 may not be uniform throughout the apparatus 500. In addition, the pressure sensitive device 500 can measure the pressure from a pressure port that is tapped into a particular plumbing line in the apparatus 500 rather than itself (the pressure sensitive device 504) being located interior to the plumbing components. For example, the pressure sensitive device 504 can be located at the intake from the vehicle, thus measuring a pressure that is comparable to a current pressure in the vehicle refrigerant system. Alternatively, the pressure sensitive device 504 can be located upstream or downstream of a vacuum pump 111 (referring to the reference numerals of FIG. 1), upstream or downstream of an oil evaporator/separator/vacuum chamber 116, upstream or downstream of a compressor 119, or upstream or downstream of a condenser 126, in various embodiments. In some embodiments, the first pressure and the second pressure will be measured at different locations within the apparatus 500.

Various components can be used in the design of the apparatus 500 illustrated in FIG. 5. For example, the pressure sensitive device 504 can be one or more pressure transducers, pressure switches, and/or pressure gauges, in various embodiments. The switching means 506 can be a valve or a solenoid, in various embodiments. The control system 514 can be a processor configured to executed instructions stored on a non-transitory computer-readable medium, in various embodiments. The status lights 516 can be light-emitting diodes (LEDs), fluorescent lights, or light bulbs, in various embodiments.

Figure 6:
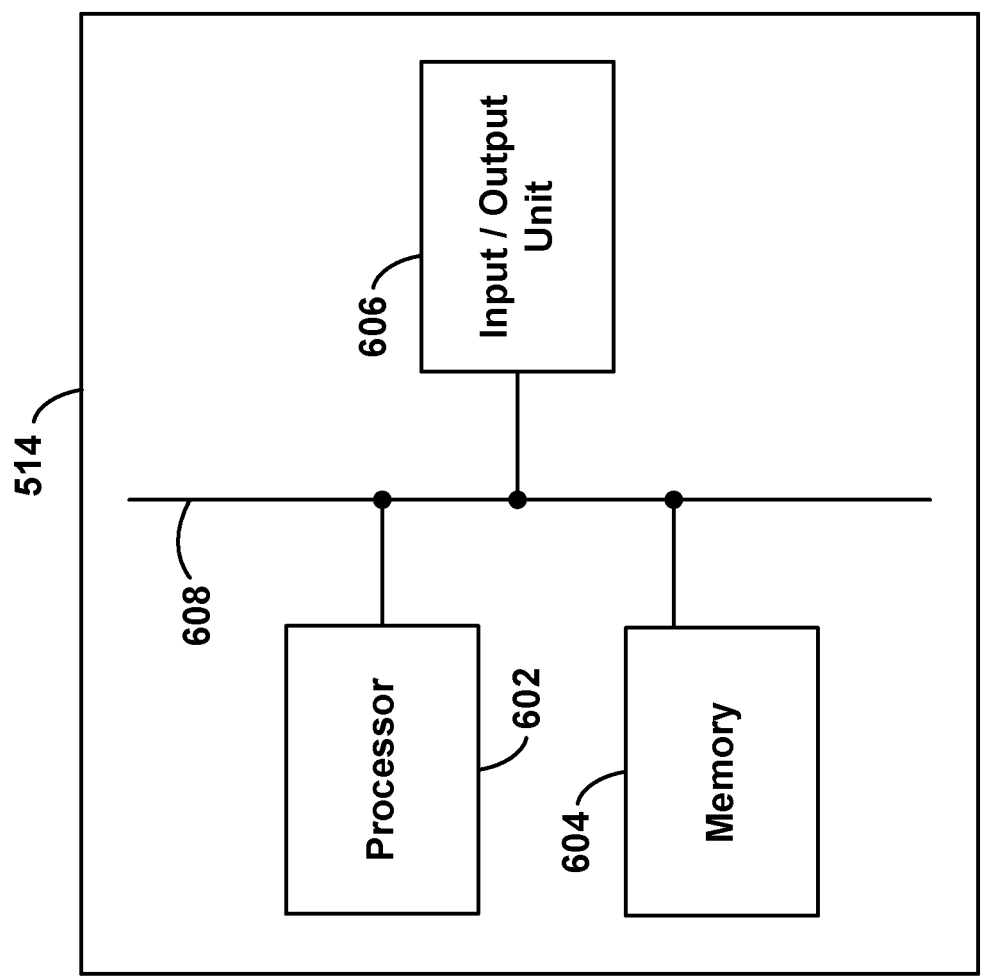
FIG. 6 is a block diagram of a control system, according to example embodiments.

FIG. 6 is a block diagram of a control system, such as the control system 514 of FIG. 5, for example, configured to control an apparatus during a refrigerant recovery process, according to example embodiments. The control system 514 can include a processor 602, a memory 604, and one or more input/output units 606, all of which can be coupled by a system bus 608 or similar mechanism.

The processor 602 can include one or more central processing units (CPUs), such as one or more general purpose processors and/or one or more dedicated processors (e.g., application specific integrated circuits, ASICs).

The memory 604, in turn, can comprise volatile and/or non-volatile data storage and can be integrated in whole or in part with the processor 602. The memory 604 can store program instructions, executable by the processor 602, and data that are manipulated by these instructions to carry out the various methods, processes, or functions described herein. Alternatively, these methods, processes, or operations can be defined by hardware, firmware, and/or any combination of hardware, firmware, and software. Therefore, the memory 604 can include a tangible, non-transitory computer-readable medium, having stored thereon program instructions that, upon execution by one or more processors 602, cause the respective devices to carry out any of the methods, processes, or functions disclosed in this specification or the accompanying drawings.

In addition, the memory 604 can store information needed to complete the recovery process. For example, the memory 604 can store the values of the first threshold pressure and the second threshold pressure.

The input/output unit 606 can include any elements included in a user interface. For instance, the input/output unit 606 can be a display for providing feedback to an end user of the apparatus 100. Additionally or alternatively, the input/output unit 606 can include a keypad for accepting user input. Thus, the input/output unit 606 can serve to configure and/or control the operation of the processor 602. The input/output unit 606 can include status indicators, such as LEDs for indicating information about the control system/apparatus 100, such as whether the apparatus 100 is powered on, the amount of space left in the storage tank 512, the lifetime run-time of the vacuum pump 508, etc. In some embodiments, the control system 514 will include multiple input/output units 606.

Figure 7:
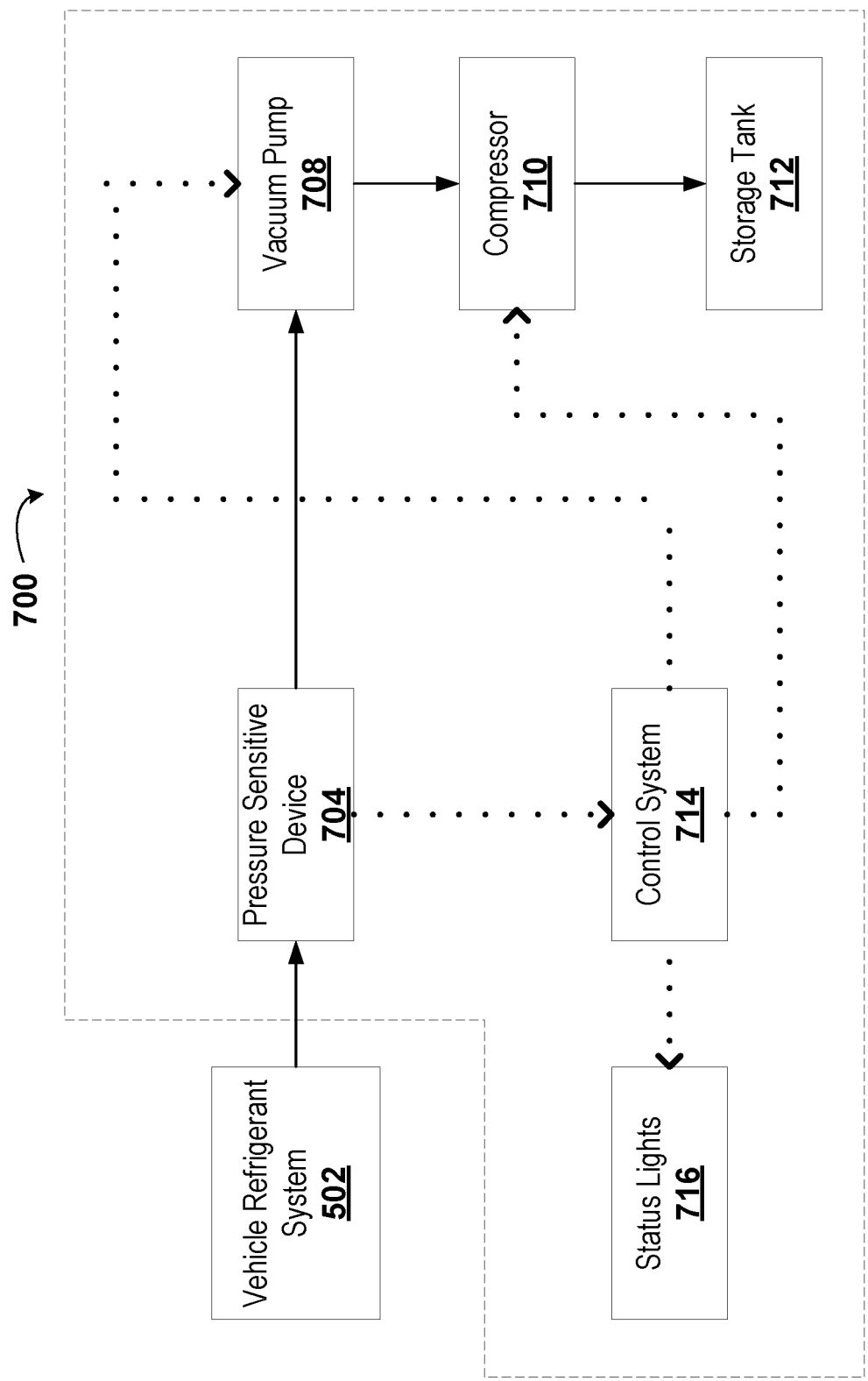
FIG. 7 is a block diagram of an apparatus, according to example embodiments.

FIG. 7 is a block diagram of an apparatus 700 configured to recover refrigerant from a vehicle refrigerant system 502, according to example embodiments. The apparatus 700 is fluidly connectable to the vehicle refrigerant system 502 and includes at least one pressure sensitive device 704, a vacuum pump 708, a compressor 710, a storage tank 712, a control system 714, and one or more status lights 716. The solid arrows in the diagram illustrate fluid connections, the dotted arrows illustrate wireless or wireline electrical connections, and the dashed box delineates those components that are part of the apparatus 700 from those components that are exterior to the apparatus 700. In alternate embodiments, some of the components bounded by the dashed box can be outside the apparatus 700. For example, the control system 714 or the storage tank 712 can be components that are not part of the apparatus 700.

Analogous to the apparatus 500 illustrated in FIG. 5, the apparatus 700 of FIG. 7 can recover refrigerant from the vehicle refrigerant system 502 using a multi-phase process. Unlike the embodiment illustrated in FIG. 5, however, the apparatus 700 of FIG. 7 does not include the switching means 506 configured to divert a fluid flow path from the compressor 510 to the vacuum pump 508. Because of this, in the apparatus 700 of FIG. 7, the refrigerant can flow through the vacuum pump 708 during both a first phase and a second phase of the recovery process.

During the first phase of the recovery process, the compressor 710 removes refrigerant from the vehicle refrigeration system 502 and deposits it in the storage tank 712, while the vacuum pump 708 can tacitly act like a channel through which the refrigerant flows. For example, valves on opposing sides of the vacuum pump 708 can be opened so the vacuum pump 708 forms a channel. During the first phase of the recovery process, the vacuum pump 708 is not engaged in creating a vacuum to assist the compressor 710 in recovering refrigerant. Similar to the vacuum pump 508 in the apparatus 500 illustrated in FIG. 5, the vacuum pump 708 can be engaged in response to receiving a transmission from the control system 714. This can occur in response to the control system 714 receiving a transmission from the pressure sensitive device 704 corresponding to a first pressure measurement that is less than a first threshold pressure. Again, this can delineate the beginning of a second phase of the recovery process.

During the second phase of the recovery process, the vacuum pump 708 is engaged in assisting the compressor 710 in withdrawing refrigerant from the vehicle refrigerant system 502. Again, similar to the apparatus 500 of FIG. 5, the vacuum pump 708 can be disengaged in response to receiving a transmission from the control system 714. This can occur in response to the control system 714 receiving a transmission from the pressure sensitive device 704 corresponding to a second pressure measurement that is less than the second threshold pressure. The can similarly delineate the end of the second phase of the recovery process.

Additionally similar to the apparatus 500 of FIG. 5, the control system 714 can detect the current status of the recovery process and illuminate one or more of the status lights 716 in a way that corresponds to the detected status.

Figure 8:
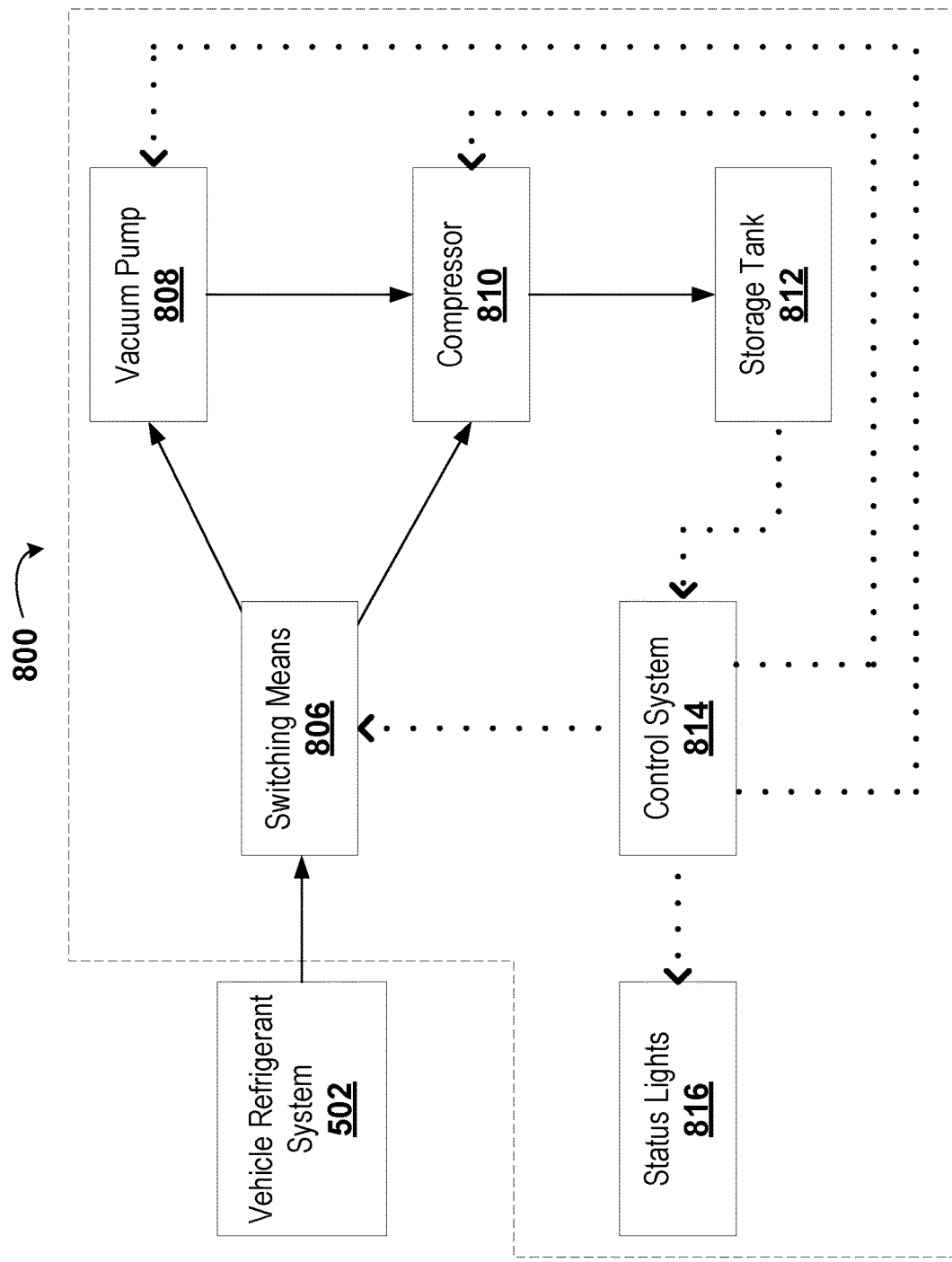
FIG. 8 is a block diagram of an apparatus, according to example embodiments.

FIG. 8 is a block diagram of an apparatus 800 configured to recover refrigerant from a vehicle refrigerant system 502, according to example embodiments. The apparatus 800 is fluidly connectable to the vehicle refrigerant system 502 and includes a switching means 806, a vacuum pump 808, a compressor 810, a storage tank 812, a control system 814, and one or more status lights 816. The solid arrows in the diagram illustrate fluid connections, the dotted arrows illustrate wireless or wireline electrical connections, and the dashed box delineates those components that are part of the apparatus 800 from those components that are exterior to the apparatus 800. In alternate embodiments, some of the components bounded by the dashed box can be outside the apparatus 800. For example, the control system 814 or the storage tank 812 can be components that are not part of the apparatus 800.

The apparatus 800 of FIG. 8 can perform the recovery of refrigerant from the vehicle refrigerant system 502 in a multi-phase process. The first phase of the recovery process can include the compressor 810 removing refrigerant from the vehicle refrigerant system 502 and depositing the recovered refrigerant in the storage tank 812, and the second phase of the recovery process can include the compressor 810 removing refrigerant from the vehicle refrigerant system 502 with the assistance of the vacuum pump 808 and depositing the recovered refrigerant in the storage tank 812. The second phase can include switching the switching means 806, in some embodiments, to divert a fluid flow to the vacuum pump 808, rather than to the compressor 810, directly. Furthermore, the second phase can be initiated by the control system 814 after a duration of time has elapsed since the first phase was initiated, for example.

Periodically during the recovery process, the control system 814 can monitor the status of one or more of the components within the apparatus 800. The control system 814 can use this information to determine the status of the recovery process. The determined status can be used by the control system 814 to transmit electrical signals to illuminate one or more of the status lights 816 to indicate the determined status.

Figure 9:
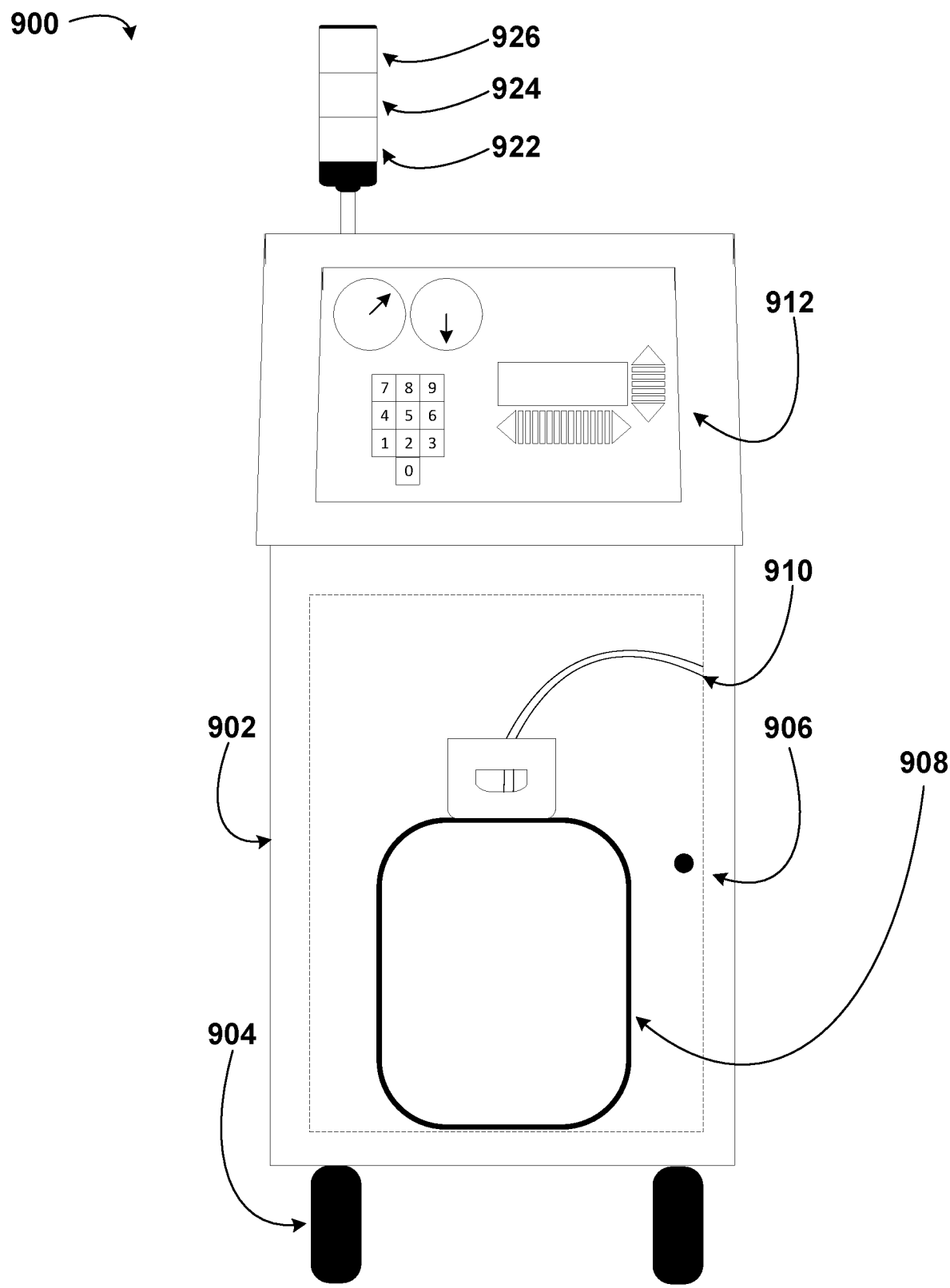
FIG. 9 is a front-view illustration of an apparatus, according to example embodiments.

FIG. 9 is a front-view illustration of an apparatus 900 configured to recover refrigerant from a vehicle, according to example embodiments. The apparatus 900 can include the apparatuses illustrated in FIG. 1, 5, 7, or 8, for example. The apparatus 900 includes a chassis 902, two or more wheels 904, an access door 906, a storage tank 908, one or more plumbing components 910, a user interface 912, and status lights 922, 924, 926. The apparatus 900 can be capable of meeting a Society of Automotive Engineers (SAE) certification standard set by the Environmental Protection Agency (EPA) of recovering 3 lbs. of refrigerant in 30 minutes from a 2010 Chevrolet Suburban®.

The chassis 902 can house multiple components of the apparatus 900. For example, the chassis 902 can house the one or more plumbing components 910, such as the plumbing components illustrated in FIG. 1 (e.g., valves, tubes, a vacuum pump, and/or a compressor). In addition, the chassis 902 houses the storage tank 908. The chassis 902 can further house electronic components, such as a control system and/or a processor that interacts with the user interface 912. The chassis 902 can also house a power supply, such as a battery or a converter that can be electrically connected to a standard outlet. The chassis 902 can have shelves to separate different components housed within the chassis 902. Alternatively or additionally, the chassis 902 can have mounting brackets to which components of the apparatus 900 are mounted.

The two or more wheels 904 enable the apparatus 900 to be rolled from one location to another within a shop or a garage, for example. In some embodiments, the wheels can have two rotational degrees of freedom (e.g., casters). In the example embodiment of FIG. 9, the apparatus 900 comprises four wheels, two in the front and two in the back.

The access door 906 can be a hinged piece of metal or plastic. Alternatively, as shown in FIG. 9, the access door 906 can be made of a transparent material, such as poly (methyl methacrylate) (PMMA). The access door 906 can permit a user to inspect components of the apparatus 900 to troubleshoot the apparatus 900 if it is not in working order. Furthermore, the access door 906 can be closed to prevent interference with the components of the apparatus 900 or contamination of the fluids within the apparatus 900. The access door 906 can be lockable, in some embodiments.

The storage tank 908 can be the storage tank 131 of the apparatus 100 illustrated in FIG. 1 that is configured to store the refrigerant recovered from the vehicle during the recovery process. The storage tank 908 can be pressurized, in some embodiments, to maintain the recovered refrigerant in a gaseous state, for example. In some embodiments, the storage tank 908 can be temperature/climate controlled within the apparatus 900.

The one or more plumbing components 910 serve as interconnects between components within the apparatus 900. The one or more plumbing components 910 can include the plumbing components shown in FIG. 1, for example.

The user interface 912 can facilitate the interaction of the apparatus 900 with a human or non-human user, such as to receive input from a user and to provide feedback to the user. The user interface 912 can allow, for example, a user to input data that corresponds to recovery process settings or to receive feedback regarding recovery process details. The user interface 912 can also allow a user to input data during a "user input required" status of the recovery process, as indicated by the status lights 922, 924, 926. Such input, once processed by a control system, can alter the status of the recovery process. The user interface 912 can include input components such as a keypad, keyboard, touch-sensitive or presence-sensitive panel, joystick, microphone, still camera, and/or video camera. The user interface 912 can also include one or more output components such as a display screen (which, for example, can be combined with a presence-sensitive panel), a cathode ray tube (CRT), a liquid crystal display (LCD), an LED-based display, a display using digital light processing (DLP®) technology, a light bulb, and/or one or more other similar devices, now known or later developed. The user interface 912 can also be configured to generate audible output(s), via a speaker, speaker jack, audio output port, audio output device, earphones, and/or other similar devices, now known or later developed in the future. The outputs of the user interface 912 can be controlled by a control system within the apparatus 900 and the inputs from the user interface 912 can be transmitted to a control system within the apparatus 900, such as a processor executing instructions stored on a non-transitory computer-readable medium.

The status lights 922, 924, 926 can be configured to indicate a determined current status of a recovery process. The status lights 922, 924, 926 illustrated in FIG. 9 can correspond to the status lights illustrated and described with respect to FIG. 5, 7, or 8, for example. The status lights 922, 924, 926 can be controlled by a control system within the apparatus 900. In some embodiments, the status lights 922, 924, 926 can be respectively visible from 360 degrees around the apparatus 900 from the horizontal plane projected outward in all directions from each of the respective status lights 922, 924, 926. Additionally or alternatively, the status lights 922, 924, 926 can be individually or collectively multiple colors. For example, status light 922 can be green and illuminated by the control system when the apparatus 900 status is "ready", status light 924 can be yellow and illuminated by the control system when the apparatus 900 status is "in progress", and status light 926 can be red and illuminated by the control system when the apparatus 900 status is "user input required". Thus, the location of the illuminated status light and the respective color would each indicate to a user the current status of the apparatus 900. In addition to "ready", "in progress", and "user input required", multiple other possible statuses can be indicated by additional colors, illumination patterns, and/or individual status lights. In alternate embodiments, there can be one status light that changes color based on the status of the apparatus 900/recovery process or changes a frequency at which it flashes based on the status of the apparatus 900/recovery process.

Figure 10:
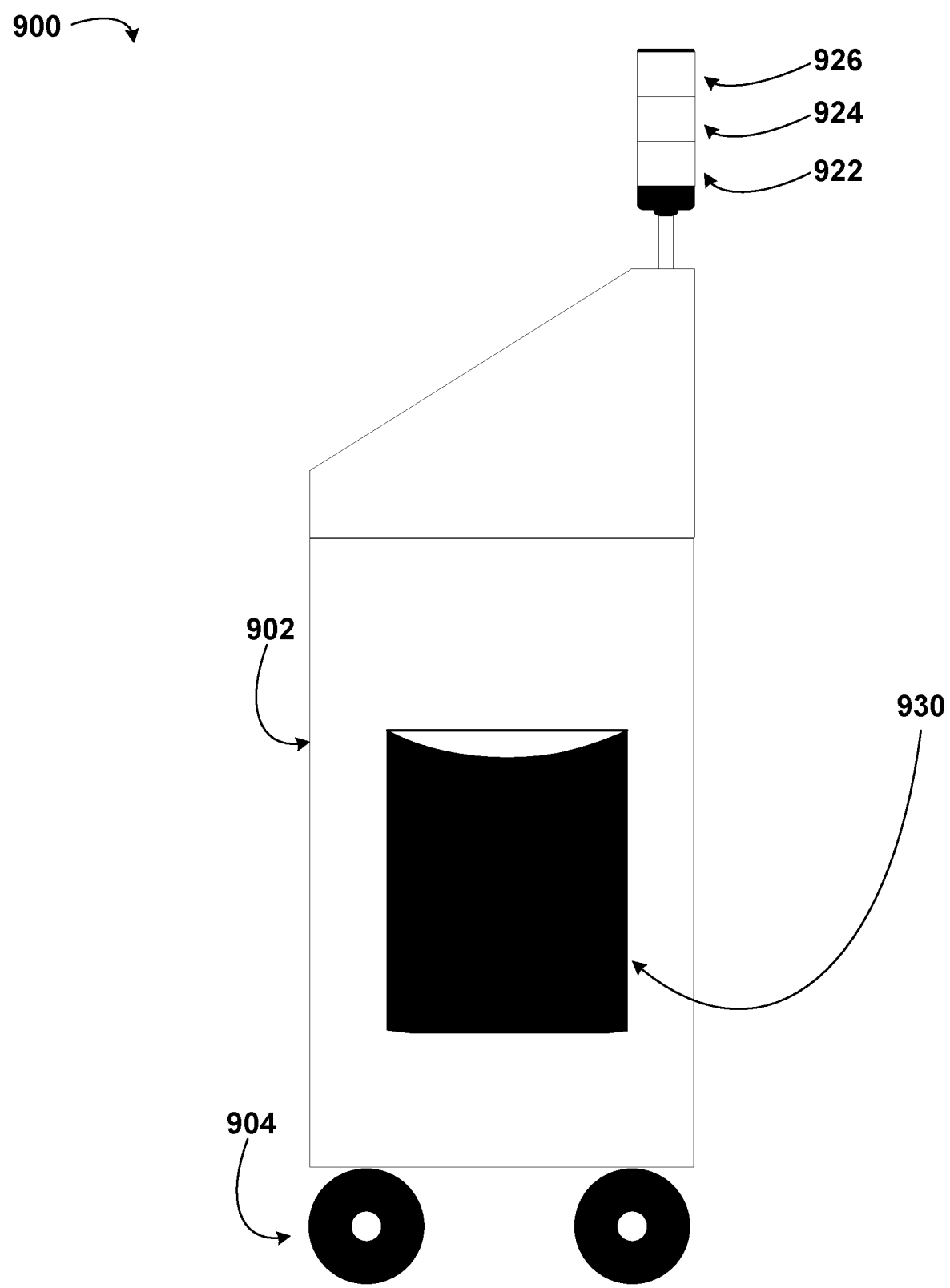
FIG. 10 is a side-view illustration of an apparatus, according to example embodiments.

FIG. 10 is a side-view illustration of the apparatus 900 configured to recover refrigerant from a vehicle, according to example embodiments. As shown in FIG. 9, the apparatus 900 has the chassis 902, the two or more wheels 904 (in this embodiment, there are four wheels), and the status lights 922, 924, 926. In addition, the side-view of FIG. 10 shows a pocket 930.

The pocket 930 is configured to hold plumbing components for use with the apparatus 900. For example, the apparatus 900 can require hoses and connectors to enable connection of the apparatus 900 to vehicles of different types (e.g., specific male and/or female connectors on the ends of hoses to connect to the high and/or low pressure fittings of different vehicle types). When not in use, these plumbing components can be stored in the pocket 930 such that they would be readily accessible when required.

FIG. 11 is an illustration of an apparatus 900 configured to recover refrigerant from a vehicle fluidly connectable to a vehicle 1150, according to example embodiments. The apparatus 900 is the same apparatus 900 as illustrated in FIGS. 9 and 10 (shown in FIG. 11 from the back). For instance, FIG. 11 shows the two or more wheels 904 and the status lights 922, 924, 926 of the apparatus 900. The apparatus 900 is connected to a vehicle refrigerant system 502 within the vehicle 1150 using a high side hose 1112 and a high side coupler 1114 and a low side hose 1122 and a low side coupler 1124. The portion of the vehicle 1150 illustrated in FIG. 11 can be located underneath the hood of the vehicle 1150, for example, among other components of the vehicle 1150.

The high side coupler 1114 and the low side coupler 1124 can be equivalent to, for example, the high pressure fitting 102 and the low pressure fitting 101, respectively, illustrated in FIGS. 1-4. The high side coupler 1114 and the low side coupler 1124 can be female connectors, as illustrated in FIG. 11. The high side coupler 1114 can be connected to the apparatus 900 through the high side hose 1112. The low side coupler 1124 can be connected to the apparatus 900 through the low side hose 1122.

III. Example Operation

Figure 12:
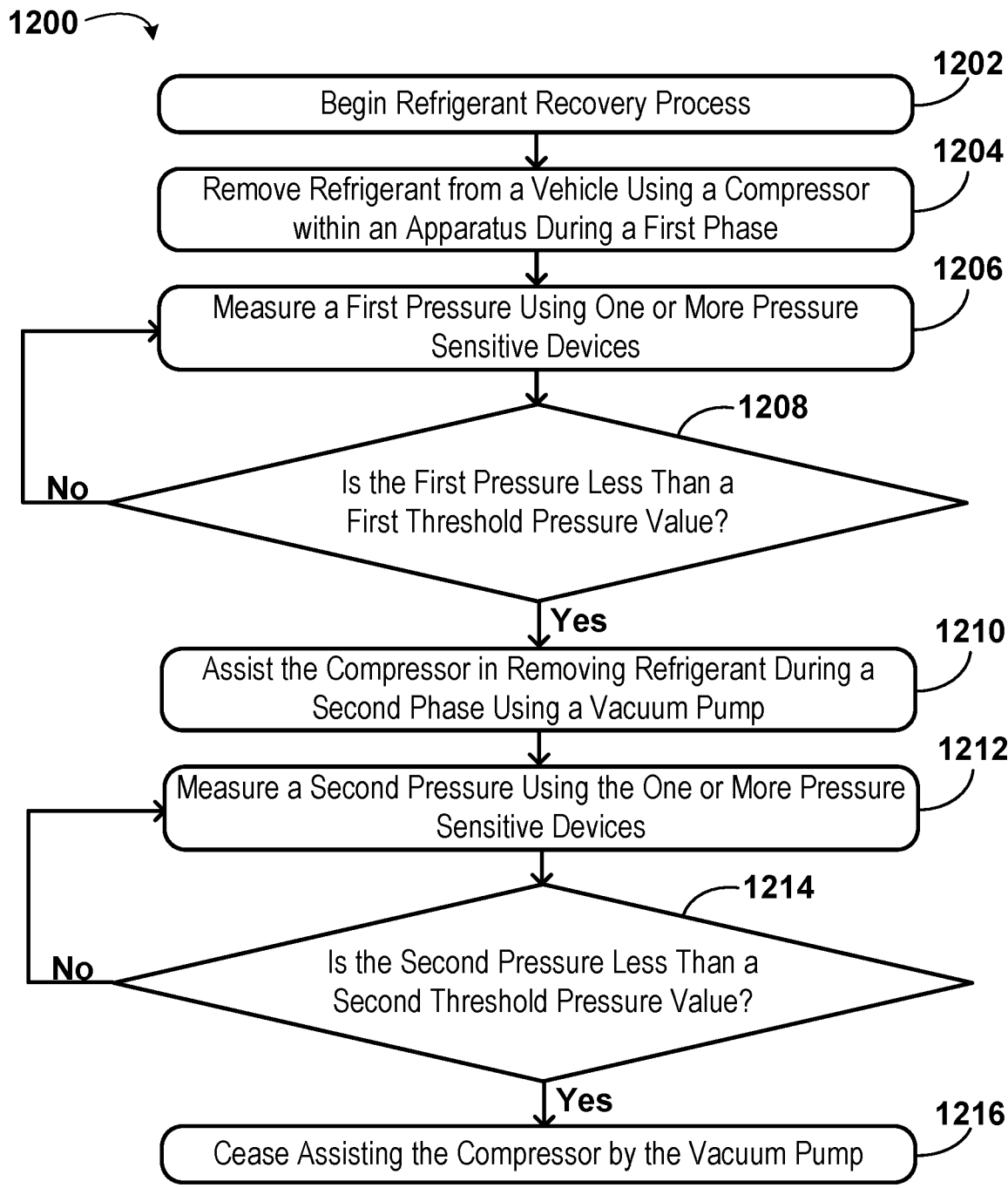
FIG. 12 is a flow chart of a method, according to example embodiments.

FIG. 12 is a flow chart of a method 1200 of recovering refrigerant that can be carried out in accordance with the example embodiments described in this description. The method 1200 includes the steps shown (1202, 1204, 1206, 1208, 1210, 1212, 1214, 1216). The following description of the method 1200 includes references to elements shown in other figures described in this description, but the steps of the method 1200 are not limited to being carried out only by the referenced elements. A variety of methods can be performed using all of the steps shown in the method 1200 or any proper subset of the steps shown in the method 1200. Any of those methods can be performed with other steps such as one or more of the other steps described in this description. For instance, a method including a function of the method 1200 can include a function from method 1300. One or more of the functions shown in the method 1200 can be carried out multiple times in performing a method in accordance with the example embodiments.

At step 1202, the method 1200 includes beginning the refrigerant recovery process. Step 1202 can include powering on an apparatus 900 configured to recover refrigerant from a vehicle. Additionally, step 1202 can include transferring a set of instructions from non-volatile memory to volatile memory and beginning execution of those instructions by a processor 602 within a control system 514. The processor 602 executing the instructions can take input(s) from a user interface 912 to modify configuration settings (e.g., the configuration settings can be data stored within a memory 604 of the control system 514), and the configuration settings can alter ways in which certain steps of the refrigerant recovery process are performed. Furthermore, step 1202 can include fluidly connecting the apparatus 900 to the vehicle using one or more hoses (e.g., a high side hose 1112 and/or a low side hose 1122). Step 1202 can further include engaging a compressor 119. The engaging of the compressor 119 can initiate a first phase of the recovery process.

At step 1204, the method 1200 includes removing refrigerant from a vehicle using the compressor 119 within an apparatus 900 during the first phase of the recovery process. During the first phase of the recovery process, a first pressure within the system (as would be measured by the one or more pressure sensitive devices) can be greater than a first threshold pressure value; the first threshold pressure value serving as a demarcation of when to move to the second phase of the recovery process. Step 1204 can include the compressor 119 removing refrigerant from the vehicle through a fluid flow path within the apparatus 900 similar to the fluid flow path illustrated in FIG. 2. Step 1204 can further include depositing the recovered refrigerant in a storage tank 131. In addition, step 1204 can include the processor 602 controlling switching means (e.g., electronic inlet valves 109/110) within the apparatus 900 to define the flow path of the refrigerant within the apparatus 900. Still further, step 1204 can include the processor 602, by executing instructions stored within the memory 604, powering on and/or engaging the compressor 119. Similarly, step 1204 can include the processor 602 powering on and/or engaging a cooling means, such as an electric fan 127, to cool a condenser 126.

At step 1206, the method 1200 includes measuring the first pressure using one or more pressure sensitive devices 504. The one or more pressure sensitive devices 504 can include a pressure transducer 108 configured to measure a fluid pressure within the apparatus 900, for example. Step 1206 can also include the one or more pressure sensitive devices 504 outputting the measured first pressure. Outputting the measured first pressure can include the one or more pressure sensitive devices 504 transmitting the measured first pressure to a processor 602 within a control system 514. Alternatively, outputting the measured first pressure can include the one or more pressure sensitive devices 504 displaying the measured first pressure (e.g., if the one or more pressure sensitive devices 504 include a gauge, the measured first pressure can be displayed on the gauge display). In still other embodiments, outputting the measured first pressure can include transmitting an analog or digital signal to a processor 602 within the control system 514. In yet other embodiments, outputting the measured first pressure can include generating a voltage differential on a circuit to the processor 602, wherein the voltage differential indicates a pressure value corresponding to the first pressure.

At step 1208, the method 1200 includes determining if the first pressure is less than the first threshold pressure value. If the first pressure is less than the first threshold pressure, the method 1200 progresses to step 1210. If the first pressure is not less than the first threshold pressure, the method 1200 returns to step 1206. Determining if the first pressure is less than the first threshold pressure value can include a processor 602 within a control system 514 comparing the first pressure to the first threshold pressure value. Alternatively, determining if the first pressure is less than the first threshold pressure value can include a pressure switch flipping and/or a pressure sensitive valve opening/closing (e.g., if the one or more pressure sensitive devices 504 include a pressure switch and/or a pressure sensitive valve).

In some embodiments of method 1200, the removal of refrigerant from the vehicle using the compressor 119 will continue to occur during the measuring and determination of steps 1206 and 1208. Therefore, in some embodiments, step 1204 can overlap with steps 1206 and/or 1208. Additionally, this overlap can occur regardless of how many recurrences of steps 1206 and 1208 occur during the execution of method 1200.

At step 1210, the method 1200 includes assisting the compressor 119 in removing refrigerant from the vehicle during a second phase of the recovery process using a vacuum pump 111. Step 1210 can include the compressor 119 removing refrigerant from the vehicle with the assistance of the vacuum pump 111 through a fluid flow path within the apparatus 900 similar to the fluid flow path illustrated in FIG. 3. Step 1210 can further include depositing the recovered refrigerant in a storage tank 131. In addition, step 1210 can include the processor 602, by executing instructions stored within the memory 604, controlling switching means (e.g., electronic inlet valves 109/110) within the apparatus 900 to re-define the flow path of the refrigerant within the apparatus 900. Still further, step 1210 can include the processor 602, by executing instructions stored within the memory 604, powering on and/or engaging the vacuum pump 111. Engaging the vacuum pump 111 could initiate the second phase of the recovery process and signal the end of the first phase of the recovery process.

At step 1212, the method 1200 includes measuring a second pressure using the one or more pressure sensitive devices 504. The one or more pressure sensitive devices 504 can include a pressure transducer 108 configured to measure a fluid pressure within the apparatus 900, for example. Step 1212 can also include the one or more pressure sensitive devices 504 outputting the measured second pressure. Outputting the measured second pressure can include the one or more pressure sensitive devices 504 transmitting the measured second pressure to a processor 602 within a control system 514. Alternatively, outputting the measured second pressure can include the one or more pressure sensitive devices 504 displaying the measured second pressure (e.g., if the one or more pressure sensitive devices 504 include a gauge, the measured second pressure can be displayed on the gauge display). In still other embodiments, outputting the measured second pressure can include transmitting an analog or digital signal to a processor 602 within the control system 514. In yet other embodiments, outputting the measured second pressure can include generating a voltage differential on a circuit to the processor 602, wherein the voltage differential indicates a pressure value corresponding to the second pressure.

At step 1214, the method 1200 includes determining if the second pressure is less than a second threshold pressure value; the second threshold pressure value being less than the first threshold pressure value. For example, the second threshold pressure value can be in a range of 1 standard atmosphere (atm) to 0.5 atm (e.g., 0.8 atm) and the first threshold pressure value can be in a range of 0.5 atm to 0.05 atm (e.g., 0.2 atm). Alternatively, the second threshold pressure value can be in a range of 0.85 atm to 0.75 atm and the first threshold pressure value can be in a range of 0.25 atm to 0.1 atm. Other example embodiments with different threshold pressure value ranges are also possible. If the second pressure is less than the second threshold pressure, the method 1200 progresses to step 1216. If the second pressure is not less than the second threshold pressure, the method 1200 returns to step 1212. Determining if the second pressure is less than the second threshold pressure value can include a processor 602 within a control system 514 comparing the second pressure to the second threshold pressure value. Alternatively, determining if the second pressure is less than the second threshold pressure value can include a pressure switch flipping and/or a pressure sensitive valve opening/closing (e.g., if the one or more pressure sensitive devices 504 include a pressure switch and/or a pressure sensitive valve).

In some embodiments of method 1200, the removal of refrigerant from the vehicle using the compressor 119 and the vacuum pump 111 will continue to occur during the measuring and determination of steps 1212 and 1214. Therefore, in some embodiments, step 1210 can overlap with steps 1212 and/or 1214. Additionally, this overlap can occur regardless of how many recurrences of steps 1212 and 1214 occur during the execution of method 1200.

At step 1216, the method 1200 includes ceasing assisting the compressor 119 in recovering refrigerant by the vacuum pump 111. Step 1216 can include the processor 602, by executing instructions stored within the memory 604, controlling switching means (e.g., electronic inlet valves 109/110) within the apparatus 900 to re-define the flow path of the refrigerant within the apparatus 900. Still further, step 1216 can include the processor 602, by executing instructions stored within the memory 604, powering off and/or disengaging the vacuum pump 111. Additionally or alternatively, step 1216 can include disengaging the compressor 119. Disengaging the compressor can signal the end of the second phase of the recovery process, for example.

In some embodiments of method 1200, there can be additional steps after step 1216. For example, there can be a third phase of the recovery process that includes removing the residual refrigerant from the plumbing within the apparatus 900 using the compressor 119. The fluid flow path for the refrigerant during the third phase can similar to the fluid flow path illustrated in FIG. 4.

Figure 13:
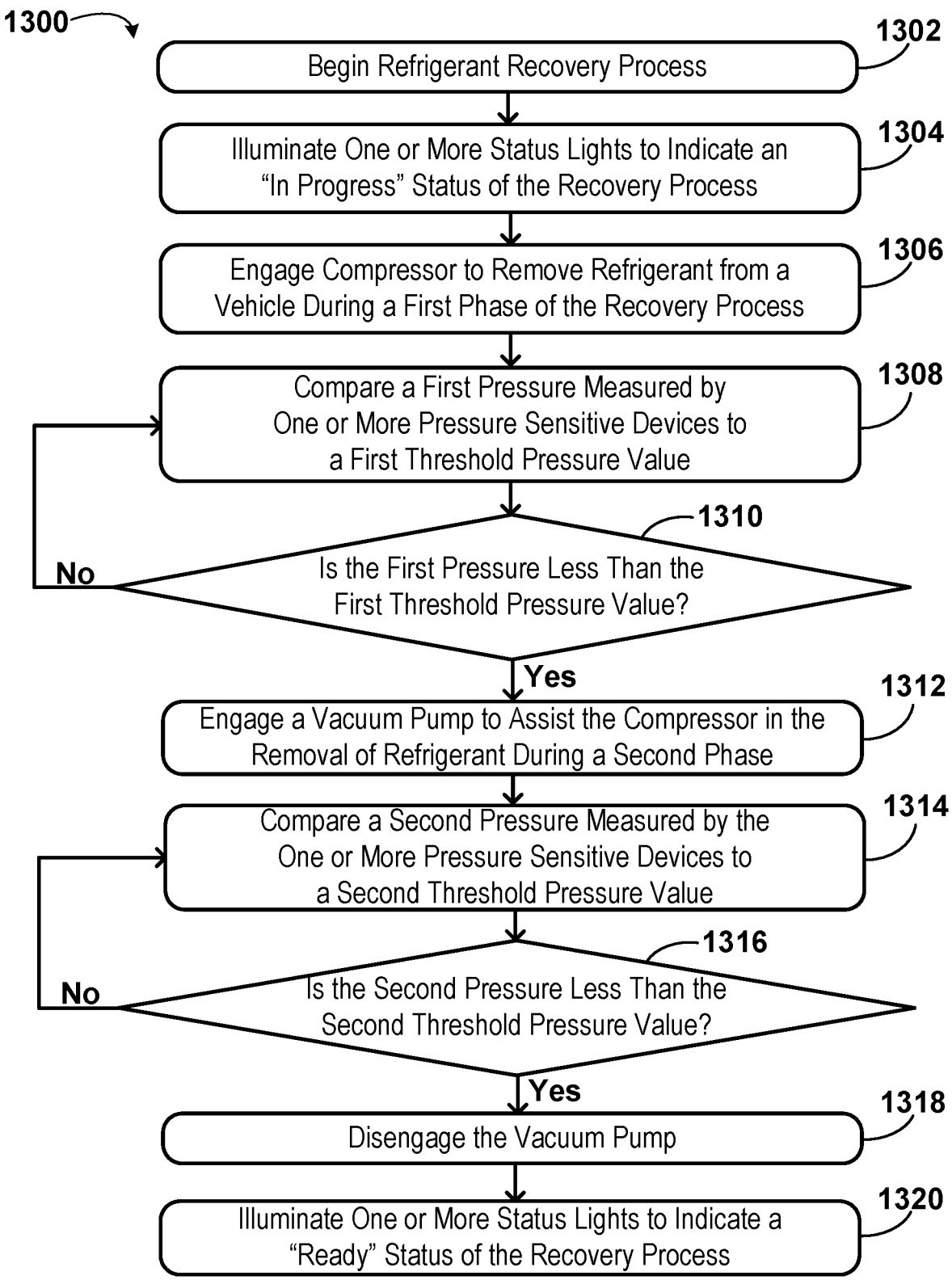
FIG. 13 is a flow chart of a method, according to example embodiments.

FIG. 13 is a flow chart of a control method that can be executed by a control system during a refrigerant recovery process that can be carried out in accordance with the example embodiments described in this description. The method 1300 includes the steps shown (1302, 1304, 1306, 1308, 1310, 1312, 1314, 1316, 1318, 1320). The following description of the method 1300 includes references to elements shown in other figures described in this description, but the steps of the method 1300 are not limited to being carried out only by the referenced elements. A variety of methods can be performed using all of the steps shown in the method 1300 or any proper subset of the steps shown in the method 1300. Any of those methods can be performed with other steps such as one or more of the other steps described in this description. For instance, a method including a function of the method 1300 can include a function from method 1200. One or more of the functions shown in the method 1300 can be carried out multiple times in performing a method in accordance with the example embodiments.

The method 1300 illustrated in FIG. 13 can represent a method that is stored within instructions in a memory 604 of a control system 514, in some embodiments. The instructions can be executed by a processor 602 of the control system 514 to perform the steps of method 1300. Therefore, the steps illustrated in FIG. 13 can represent actions performed by the processor 602. The steps can be performed by the processor 602 transmitting electrical signals to other components of the apparatus 900, for example.

At step 1302, the method 1300 includes beginning the refrigerant recovery process. Step 1302 can occur in response to an input received from a user through a user interface 912. Step 1302 can include the processor taking input(s) from the user interface 912 to modify configuration settings (e.g., the configuration settings can be data stored within the memory 604 of the control system 514), and the configuration settings can alter ways in which certain steps of the refrigerant recovery process are performed.

At step 1304, the method 1300 includes illuminating one or more status lights to indicate an "in progress" status of the recovery process. In some embodiments, step 1304 can include the processor 602 outputting a signal to one or more of the status lights 922, 924, 926 that indicates a specific color of illumination or a frequency with which to modulate the light output. For example, the "in progress" status can be indicated by status light 924 flashing at 0.5 Hz. Additionally or alternatively, the "in progress" status can be indicated by status light 924 illuminating in yellow. Many illumination schemes of a subset of status lights to indicate the recovery process status are possible. Furthermore, step 1304 can include the processor 602 outputting a message to a display within the user interface 912 that indicates the "in progress" status of the recovery process.

At step 1306, the method 1300 includes engaging the compressor 119 to remove refrigerant from a vehicle during a first phase of the recovery process. This can be done via an electrical signal sent from the processor 602 to the compressor 119. Step 1306 can also include the processor 602 controlling switching means (e.g., electronic inlet valves 109/110) within the apparatus 900 to define the flow path of the refrigerant within the apparatus 900. Furthermore, step 1306 can include the processor 602 sending an electrical signal to engage a cooling means, such as an electric fan 127, to cool a condenser 126.

At step 1308, the method 1300 includes comparing a first pressure measured by one or more pressure sensitive devices 504 (e.g., a pressure transducer) to a first threshold pressure value. Step 1308 can include the processor 602 receiving the first pressure value via a transmission from one or more of the pressure sensitive devices 504. Additionally, step 1308 can include the processor 602 retrieving the first threshold pressure value from the memory 604. Alternatively, step 1308 can include the processor 602 retrieving the first threshold pressure value from an input of the user interface 912. In some embodiments, step 1308 can include the processor 602 subtracting the first threshold pressure value from the first pressure measured by one or more of the pressure sensitive devices 504. If the resulting value is positive, the first pressure is greater than the first threshold pressure. If the resulting value is zero, the first pressure is equal to the first threshold pressure. If the resulting value is negative, the first pressure is less than the first threshold pressure.

At step 1310, the method 1300 includes determining if the first pressure is less than the first threshold pressure. If the first pressure is less than the first threshold pressure, the method 1300 progresses to step 1312. If the first pressure is not less than the first threshold pressure, the method 1300 returns to step 1308. The comparison of step 1308 performed by the processor 602 makes the determination of step 1310.

At step 1312, the method 1300 includes engaging a vacuum pump 111 to assist the compressor 119 in removing refrigerant from the vehicle during a second phase of the recovery process. Step 1312 can include the processor 602 sending a signal to illuminate one or more status lights to indicate that the second phase of the recovery process is currently underway. Alternatively, in some embodiments, step 1312 can include transmitting an electrical signal to illuminate one or more of the status lights to indicate an "in progress" status of the recovery process. Furthermore, step 1312 can include transmitting an electrical signal from the processor 602 to the vacuum pump 111 to engage the vacuum pump 111. Engaging the vacuum pump 111 can include closing electrical relays or electrical switches, in some embodiments. Step 1312 can also include the processor 602 controlling switching means (e.g., electronic inlet valves 109/110) within the apparatus 900 to re-define the flow path of the refrigerant within the apparatus 900.

At step 1314, the method 1300 includes comparing a second pressure measured by the one or more pressure sensitive devices 504 to a second threshold pressure value; the second threshold pressure value being less than the first threshold pressure value. Step 1314 can include the processor 602 receiving the second pressure value via a transmission from one or more of the pressure sensitive devices 504. Additionally, step 1314 can include the processor 602 retrieving the second threshold pressure value from the memory 604. Alternatively, step 1314 can include the processor 602 retrieving the second threshold pressure value from an input of the user interface 912. Step 1314 can include the processor 602 subtracting the second threshold pressure value from the second pressure measured by one or more of the pressure sensitive devices 504. If the resulting value is positive, the second pressure is greater than the second threshold pressure. If the resulting value is zero, the second pressure is equal to the second threshold pressure. If the resulting value is negative, the second pressure is less than the second threshold pressure.

At step 1316, the method 1300 includes determining if the second pressure is less than the second threshold pressure value. If the second pressure is less than the second threshold pressure, the method 1300 progresses to step 1318. If the second pressure is not less than the second threshold pressure, the method 1300 returns to step 1314. The comparison of step 1314 performed by the processor 602 makes the determination of step 1316.

At step 1318, the method 1300 includes disengaging the vacuum pump 111 to cease the vacuum pump 111 from assisting the compressor 119 in removing refrigerant from the vehicle. Step 1318 can include transmitting an electrical signal from the processor 602 to the vacuum pump 111 to disengage the vacuum pump 111. Step 1318 can also include the processor 602 controlling switching means (e.g., electronic inlet valves 109/110) within the apparatus 900 to re-define the flow path of the refrigerant within the apparatus 900.

At step 1320, the method 1300 includes illuminating one or more status lights to indicate a "ready" status of the recovery process. In some embodiments, step 1320 can include the processor 602 outputting a signal to one or more of the status lights 922, 924, 926 that indicates a specific color of illumination or a frequency with which to modulate the light output. For example, the "ready" status can be indicated by status light 922 flashing at 0.2 Hz. Additionally or alternatively, the "ready" status can be indicated by status light 922 illuminating in green. Many illumination schemes of a subset of status lights to indicate the recovery process status are possible. Furthermore, step 1320 can include the processor 602 outputting a message to a display within the user interface 912 that indicates the "ready" status of the recovery process.

Alternatively, if user input is required, step 1320 can include illuminating one or more status lights to indicate a "user input required" status of the recovery process. The required user input can include a cleaning and/or replacement of a subset of the plumbing components within the apparatus 900. For example, the "user input required" status can be indicated by status light 926 flashing at 2 Hz. Additionally or alternatively, the "user input required" status can be indicated by status light 926 illuminating in red. Many illumination schemes of a subset of status lights to indicate the recovery process status are possible. Furthermore, step 1320 can include the processor 602 outputting a message to a display within the user interface 912 that indicates the "user input required" status of the recovery process.

Similarly, various other steps in method 1300 can include illuminating one or more status lights to indicate a "user input required" status of the recovery process. This can occur in response to an error within the apparatus detected by the processor 602, for example.

IV. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein is for the purpose of describing particular embodiments only, and is not intended to be limiting.

We claim:

1. An apparatus comprising:
   a compressor configured to remove refrigerant from a vehicle during both a first phase of removing refrigerant from the vehicle and a second phase of removing refrigerant from the vehicle and to compress refrigerant in a gaseous state;
   a vacuum pump configured to assist the compressor in removing refrigerant from the vehicle during the second phase of removing refrigerant from the vehicle, wherein the vacuum pump is fluidly connected in series with the compressor during the second phase of removing refrigerant from the vehicle;
   a storage tank configured to store refrigerant removed from the vehicle;
   a condenser configured to transform refrigerant from the gaseous state to a liquid state;
   one or more status lights; and
   one or more processors programmed to stop the vacuum pump from assisting the compressor in removing refrigerant from the vehicle by disengaging the vacuum pump and afterwards illuminate at least a first status light of the one or more status lights to indicate a ready status of a recovery process that includes both the first phase of removing refrigerant from the vehicle and the second phase of removing refrigerant from the vehicle, wherein the first status light is visible from 360 degrees around the apparatus in a respective horizontal plane projected outward from the first status light; and
   wherein the one or more processors are configured to control a first switch to divert the refrigerant from the vehicle around the vacuum pump by being closed during the first phase of removing refrigerant from the vehicle and to permit the refrigerant from the vehicle to flow to the vacuum pump by being open during the second phase of removing refrigerant from the vehicle;
   wherein the one or more processors are configured to control a second switch to divert the refrigerant from the vehicle around the vacuum pump by being open during the first phase of removing refrigerant from the vehicle and to be closed during the second phase of removing refrigerant from the vehicle, and
   wherein the first switch includes a first valve and a first solenoid, and the second switch includes a second valve and a second solenoid, or wherein the first switch and the second switch are configured as a single three-way valve.

2. The apparatus of claim 1,
   wherein the one or more processors are further programmed to determine a second status of the apparatus and to illuminate a second status light of the one or more status lights, and
   wherein the second status comprises an in-progress status.

3. The apparatus of claim 2,
   wherein the one or more processors are further programmed to determine a third status of the apparatus and to illuminate a third status light of the one or more status lights, and
   wherein the third status comprises a user input required status.

4. The apparatus of claim 1, further comprising:
   one or more pressure sensitive devices, each configured to measure a first pressure and/or a second pressure in the apparatus,
   wherein the vacuum pump begins assisting in response to the first pressure in the apparatus, as measured by at least one of the one or more pressure sensitive devices, being less than a first threshold pressure,
   wherein the vacuum pump ceases assisting in response to the second pressure in the apparatus, as measured by at least one of the one or more pressure sensitive devices, being less than a second threshold pressure, and
   wherein the first threshold pressure is greater than the second threshold pressure.

5. The apparatus of claim 4,
   wherein the one or more processors are further programmed to control the compressor and the vacuum pump, wherein controlling the compressor and vacuum pump includes:
   engaging the compressor to remove refrigerant from the vehicle during the first phase and the second phase of the recovery process;
   engaging the vacuum pump, in response to the first pressure in the apparatus, as measured by at least one of the one or more pressure sensitive devices, being less than the first threshold pressure, to assist the compressor; and
   disengaging the vacuum pump, in response to the second pressure in the apparatus, as measured by at least one of the one or more pressure sensitive devices, being less than the second threshold pressure, to cease assisting the compressor.

6. The apparatus of claim 1, further comprising:
   wherein the one or more processors are further programmed to control the compressor and the vacuum pump, wherein controlling the compressor and vacuum pump includes:
   engaging the compressor to remove refrigerant from the vehicle during the first phase and the second phase of the recovery process;
   engaging the vacuum pump to assist the compressor during the second phase of the recovery process; and
   disengaging the vacuum pump to cease assisting the compressor.

7. The apparatus of claim 1, further comprising:
   at least one component for refilling a vehicle air conditioning system with the refrigerant stored in the storage tank.

8. The apparatus of claim 7, further comprising: at least one from among the following for refilling the vehicle air conditioning system: a check valve, an electronic control valve, a filter, or a pressure transducer.

9. The apparatus of claim 1,
wherein the one or more status lights include the first status light, a second status light, and a third status light,
wherein the one or more processors are configured to illuminate the second status light in response to determining a status of the apparatus is an in-progress status, and
wherein the one or more processors are configured to illuminate the third status light in response to determining a status of the apparatus is a user input required status.

10. The apparatus of claim 1,
wherein the one or more status lights comprise at least two different colored lights,
wherein the at least two different colored lights include a first colored light and a second colored light, and
wherein both of the first colored light and the second colored light emit different colored light.

11. The apparatus of claim 1, wherein the one or more processors are programmed to determine a second status of the apparatus and to illuminate at least one of the one or more status lights by repeatedly flashing on and off.

12. A method for indicating status of an apparatus configured to service vehicular air conditioning systems, the apparatus comprising a compressor, a condenser, and a storage tank, the method comprising:
removing, using the compressor, refrigerant from a vehicle during both a first phase of removing refrigerant from the vehicle and a second phase of removing refrigerant from the vehicle;
assisting, by a vacuum pump, the compressor in removing refrigerant from the vehicle during the second phase of removing refrigerant from the vehicle, wherein the vacuum pump is fluidly connected in series with the compressor during the second phase of removing refrigerant from the vehicle;
stopping, by one or more processors of the apparatus, the vacuum pump from assisting the compressor in removing refrigerant from the vehicle by disengaging the vacuum pump and afterwards illuminating, by the one or more processors, at least a first status light of one or more status lights to indicate a ready status of a recovery process that includes both the first phase of removing refrigerant from the vehicle and the second phase of removing refrigerant from the vehicle;
closing, by the one or more processors, a first switch, wherein the one or more processors are configured to close the first switch to divert the refrigerant from the vehicle around the vacuum pump during the first phase of removing refrigerant from the vehicle and opening, by the one or more processors, the first switch, wherein the one or more processors are configured to open the first switch during the second phase of removing refrigerant from the vehicle to permit the refrigerant from the vehicle to flow to the vacuum pump; and
opening, by the one or more processors, a second switch, wherein the one or more processors are configured to open the second switch during the first phase of removing refrigerant from the vehicle to divert the refrigerant from the vehicle around the vacuum pump and closing, by the one or more processors, the second switch, wherein the one or more processors are configured to close the second switch during the second phase of removing refrigerant from the vehicle,
wherein the first switch includes a first valve and a first solenoid, and the second switch includes a second valve and a second solenoid, or wherein the first switch and the second switch are configured as a single three-way valve, and
wherein the first status light is visible from 360 degrees around the apparatus in a respective horizontal plane projected outward from the first status light.

13. The method of claim 12, further comprising:
determining, by the one or more processors, a second status of the apparatus, wherein the second status is an in progress status of the recovery process,
illuminating, by the one or more processors, at least a second status light of the one or more status lights to represent the second status of the apparatus,
wherein the second status light is visible from 360 degrees around the apparatus in a respective horizontal plane projected outward from the second status light.

14. The method of claim 13, further comprising:
engaging, by the one or more processors, the compressor to remove refrigerant from the vehicle during the first phase removing refrigerant from the vehicle.

15. The method of claim 13, further comprising:
determining a second status of the apparatus; and
illuminating a second status light of the one or more status lights,
wherein the second status comprises an in-progress status.

16. The method of claim 15, further comprising:
determining a third status of the recovery process; and
illuminating a third status light of the one or more status lights, and
wherein the third status comprises a user input required status.

17. The method of claim 12,
wherein the one or more status lights comprise at least two different colored lights, wherein the at least two different colored lights include a first colored light and a second colored light, and
wherein both of the first colored light and the second colored light emit different colored light.

18. A non-transitory computer-readable medium having stored thereon instructions executable by one or more processors to control an apparatus configured to recover refrigerant from a vehicle to perform functions comprising:
removing, using a compressor, refrigerant from a vehicle during both a first phase of removing refrigerant from the vehicle and a second phase of removing refrigerant from the vehicle;
assisting, by a vacuum pump, the compressor in removing refrigerant from the vehicle during the second phase of removing refrigerant from the vehicle, wherein the vacuum pump is fluidly connected in series with the compressor during the second phase of removing refrigerant from the vehicle; and
stopping the vacuum pump from assisting the compressor in removing refrigerant from the vehicle by disengaging the vacuum pump and afterwards illuminating at least a first status light of one or more status lights to indicate a ready status of a recovery process that includes both the first phase of removing refrigerant from the vehicle and the second phase of removing refrigerant from the vehicle;
closing, by the one or more processors, a first switch, wherein the one or more processors executing the instructions are configured to close the first switch to divert the refrigerant from the vehicle around the vacuum pump during the first phase of removing refrigerant from the vehicle and opening, by the one or more processors, the first switch, wherein the one or more processors executing the instructions are configured to open the first switch during the second phase of removing refrigerant from the vehicle to permit the refrigerant from the vehicle to flow to the vacuum pump; and opening, by the one or more processors, a second switch, wherein the one or more processors executing the instructions are configured to open the second switch during the first phase of removing refrigerant from the vehicle to divert the refrigerant from the vehicle around the vacuum pump and closing, by the one or more processors, the second switch, wherein the one or more processors executing the instructions are configured to close the second switch during the second phase of removing refrigerant from the vehicle, wherein the first switch includes a first valve and a first solenoid, and the second switch includes a second valve and a second solenoid, or wherein the first switch and the second switch are configured as a single three-way valve, and wherein the first status light is visible from 360 degrees around the apparatus in a respective horizontal plane projected outward from the first status light.

19. The non-transitory computer-readable medium of claim 18, wherein the functions further comprise:

determining a second status of the apparatus; and illuminating a second status light of the one or more status lights, wherein the second status comprises an in-progress status.

20. The non-transitory computer-readable medium of claim 19, wherein the functions further comprise:

determining a third status of the recovery process; and illuminating a third status light of the one or more status lights, and wherein the third status comprises a user input required status.

21. The apparatus of claim 1, wherein the one or more status lights include the first status light and a second status light, and wherein the first status light is above the second status light.

22. The apparatus of claim 1, further comprising:

one or more pressure transducer, switch or gauge, each configured to measure a first pressure and/or a second pressure in the apparatus, wherein the vacuum pump begins assisting in response to the first pressure in the apparatus, as measured by at least one of the one or more pressure transducer, switch or gauge, being less than a first threshold pressure, wherein the vacuum pump ceases assisting in response to the second pressure in the apparatus, as measured by at least one of the one or more pressure transducer, switch or gauge, being less than a second threshold pressure, and wherein the first threshold pressure is greater than the second threshold pressure.

23. The apparatus of claim 22, wherein the one or more processors are further programmed to control the compressor and the vacuum pump, wherein controlling the compressor and vacuum pump includes:

engaging the compressor to remove refrigerant from the vehicle during the first phase and the second phase of the recovery process;

engaging the vacuum pump, in response to the first pressure in the apparatus, as measured by at least one of the one or more pressure transducer, switch or gauge, being less than the first threshold pressure, to assist the compressor; and disengaging the vacuum pump, in response to the second pressure in the apparatus, as measured by at least one of the one or more pressure transducer, switch or gauge, being less than the second threshold pressure, to cease assisting the compressor.

24. An apparatus according to claim 1, wherein the one or more status lights includes one status light that changes color based on a status of the apparatus.

25. A method according to claim 12, wherein the first status light includes one status light that changes color based on the status of the apparatus.

26. A non-transitory computer-readable medium according to claim 18, wherein the first status light includes one status light that changes color based on a status of the apparatus.

* * * * *